(12) United States Patent
Rippel et al.

(10) Patent No.: US 11,255,612 B2
(45) Date of Patent: Feb. 22, 2022

(54) WOUND STRIP MACHINE

(71) Applicant: ENURE, INC., Los Angeles, CA (US)

(72) Inventors: Eric Rippel, Los Angeles, CA (US); Wally E. Rippel, Altadena, CA (US)

(73) Assignee: ENURE, INC., Los Angeles, CA (US)

( * ) Notice: Subject to any disclaimer, the term of this patent is extended or adjusted under 35 U.S.C. 154(b) by 21 days.

(21) Appl. No.: 16/938,803

(22) Filed: Jul. 24, 2020

(65) Prior Publication Data

US 2020/0355447 A1 Nov. 12, 2020

Related U.S. Application Data

(63) Continuation-in-part of application No. 16/114,057, filed on Aug. 27, 2018, now Pat. No. 10,756,583, which is a continuation-in-part of application No. 14/807,697, filed on Jul. 23, 2015, now Pat. No. 10,060,682.

(Continued)

(51) Int. Cl.
| | |
|---|---|
| *F28F 1/02* | (2006.01) |
| *F28D 1/047* | (2006.01) |
| *H02K 3/24* | (2006.01) |
| *H02K 9/197* | (2006.01) |
| *H01F 27/245* | (2006.01) |

(52) U.S. Cl.
CPC ............ *F28F 1/025* (2013.01); *F28D 1/0473* (2013.01); *H01F 27/245* (2013.01); *H02K 3/24* (2013.01); *H02K 9/197* (2013.01)

(58) Field of Classification Search
CPC .... F28F 1/025; F28F 1/02; F28F 3/086; F28F 2250/04; F28D 1/0473; F28D 7/02; H01F 27/08; H01F 27/245; H01F 27/25; H01F 27/322; H02K 5/20; H02K 9/00; H02K 9/197; H02K 1/20; H02K 1/32; H02K 9/19; H02K 9/193
USPC .................................................. 165/163, 157
See application file for complete search history.

(56) References Cited

U.S. PATENT DOCUMENTS

| | | |
|---|---|---|
| 1,877,904 A | 9/1932 | Laffoon |
| 1,893,484 A * | 1/1933 | Belt .......................... F28D 7/04 165/160 |

(Continued)

FOREIGN PATENT DOCUMENTS

| | | |
|---|---|---|
| CN | 1599197 A | 3/2005 |
| CN | 102538562 A | 7/2012 |

(Continued)

OTHER PUBLICATIONS

Chinese Notification of the First Office Action, for Patent Application No. 201580041169.4 dated Apr. 3, 2018, 12 pages.

(Continued)

*Primary Examiner* — Justin M Jonaitis
(74) *Attorney, Agent, or Firm* — Lewis Roca Rothgerber Christie LLP

(57) ABSTRACT

An electric machine. The electric machine includes one or more face wound strips including a first strip. The one or more strips have a plurality of openings. The first strip has a plurality of turns, and an opening of a turn of the first strip overlaps an opening of an adjacent turn, to form a portion of a fluid channel of a plurality of fluid channels. The turn and the adjacent turn abut against each other at the overlapping openings.

23 Claims, 21 Drawing Sheets

Related U.S. Application Data

(60) Provisional application No. 62/029,357, filed on Jul. 25, 2014.

(56) References Cited

U.S. PATENT DOCUMENTS

| | | | |
|---|---|---|---|
| 2,433,660 A | 12/1947 | Granfield | |
| 2,471,317 A | 5/1949 | Fausek et al. | |
| 2,607,816 A | 8/1952 | Ryder et al. | |
| 2,711,008 A | 6/1955 | Smith | |
| 2,774,000 A | 12/1956 | Ross | |
| 2,792,511 A | 5/1957 | Horstman | |
| 2,981,856 A | 4/1961 | Ludemann et al. | |
| 3,165,655 A | 1/1965 | Eis | |
| 3,206,964 A * | 9/1965 | Hart | B21D 11/06 72/142 |
| 3,225,424 A * | 12/1965 | Wiley | H02K 1/26 29/605 |
| 3,257,572 A | 6/1966 | Ludemann et al. | |
| 3,288,209 A | 11/1966 | Wall et al. | |
| 3,447,002 A | 5/1969 | Rönnevig | |
| 3,498,370 A * | 3/1970 | Raggs | F28D 7/026 165/156 |
| 3,597,645 A | 8/1971 | Duffert | |
| 3,827,141 A | 8/1974 | Hallerback | |
| 3,896,320 A | 7/1975 | Moffatt | |
| 4,200,818 A | 4/1980 | Ruffing et al. | |
| 4,208,597 A | 6/1980 | Mulach et al. | |
| 4,392,073 A | 7/1983 | Rosenberry, Jr. | |
| 4,425,521 A | 1/1984 | Rosenberry, Jr. et al. | |
| 4,672,252 A | 6/1987 | Spirk | |
| 4,745,314 A | 5/1988 | Nakano | |
| 4,993,487 A | 2/1991 | Niggemann | |
| 5,325,684 A | 7/1994 | Stierlin et al. | |
| 5,365,211 A | 11/1994 | Carbaugh, Jr. et al. | |
| 5,760,516 A | 6/1998 | Baumann et al. | |
| 5,859,482 A | 1/1999 | Crowell et al. | |
| 5,889,342 A | 3/1999 | Hasebe et al. | |
| 6,121,708 A | 9/2000 | Müller | |
| 6,239,530 B1 | 5/2001 | Garcia | |
| 6,265,801 B1 | 7/2001 | Hashiba et al. | |
| 6,304,018 B1 | 10/2001 | Ham et al. | |
| 6,535,099 B1 | 3/2003 | Hernandez Cruz | |
| 6,611,076 B2 | 8/2003 | Lindbery et al. | |
| 6,710,479 B2 | 3/2004 | Yoshida et al. | |
| 6,724,119 B1 | 4/2004 | Wellisch | |
| 6,787,948 B2 | 9/2004 | Peterson et al. | |
| 6,903,471 B2 | 6/2005 | Arimitsu et al. | |
| 6,954,010 B2 | 10/2005 | Rippel et al. | |
| 7,057,324 B2 | 6/2006 | Breznak et al. | |
| 7,122,923 B2 | 10/2006 | Lafontaine et al. | |
| 7,661,460 B1 | 2/2010 | Cowans et al. | |
| 7,851,966 B2 | 12/2010 | Rippel | |
| 8,405,262 B1 | 3/2013 | Beatty et al. | |
| 2005/0115699 A1 | 6/2005 | Nuris et al. | |
| 2007/0013241 A1 | 1/2007 | Schiferl et al. | |
| 2009/0113696 A1 | 5/2009 | Holmes | |
| 2009/0195092 A1 | 8/2009 | Gagnon | |
| 2009/0195108 A1 | 8/2009 | Rippel | |
| 2011/0094720 A1 | 4/2011 | Wang et al. | |
| 2011/0254391 A1 | 10/2011 | Elender et al. | |
| 2012/0080964 A1 | 4/2012 | Bradfield | |
| 2012/0080983 A1 | 4/2012 | Iund | |
| 2012/0086291 A1 | 4/2012 | DeBlock et al. | |
| 2012/0267971 A1 | 10/2012 | Husum et al. | |
| 2013/0049496 A1 | 2/2013 | Chamberlin et al. | |
| 2013/0069455 A1 | 3/2013 | Hamer et al. | |
| 2013/0113311 A1 | 5/2013 | Downing et al. | |
| 2013/0119816 A1 | 5/2013 | Yang et al. | |
| 2014/0042841 A1 | 2/2014 | Rippel et al. | |
| 2015/0280525 A1 | 10/2015 | Rippel et al. | |
| 2016/0087509 A1 | 3/2016 | Rippel et al. | |
| 2016/0226327 A1 | 8/2016 | Rippel et al. | |
| 2016/0265808 A1* | 9/2016 | Magnone | F28D 7/024 |

FOREIGN PATENT DOCUMENTS

| | | |
|---|---|---|
| CN | 102538562 B | 8/2013 |
| DE | 39 43 626 C2 | 3/1994 |
| GB | 2484386 A | 4/2012 |
| JP | 06-224024 A | 8/1994 |
| JP | H10271716 A | 10/1998 |
| JP | 2000-232740 A | 8/2000 |
| JP | 2002-93624 A | 3/2002 |
| JP | 2003-134701 A | 5/2003 |
| JP | 2004-215495 A | 7/2004 |
| JP | 2004-236495 A | 8/2004 |
| JP | 2005-333697 A | 12/2005 |
| JP | 2007-209070 A | 8/2007 |
| WO | WO 01/05015 A2 | 1/2001 |
| WO | WO 03/094323 A1 | 11/2003 |

OTHER PUBLICATIONS

German Examination Report issued in Application No. 11 2015 003 443.9, dated May 4, 2018, 7 pages.

International Search Report and Written Opinion for International Application No. PCT/US15/41824, dated Oct. 23, 2015, 10 pages.

International Search Report and Written Opinion for related International Patent Application No. PCT/US2015/021453; dated Aug. 14, 2015 (19 pages).

International Search Report and Written Opinion for related International Patent Application No. PCT/US2015/050649; dated Dec. 10, 2015 (11 pages).

International Search Report and Written Opinion for related International Patent Application No. PCT/US2016/015700, dated Apr. 1, 2016 (9 pages).

Invitation to Pay Additional Fees and, where Application, Protest Fee for PCT Application No. PCT/US2015/021453, dated Jun. 15, 2015, 9 pages.

Japanese Notice of Reasons for Rejection, with partial English translation, for Patent Application No. 2017-525315, dated Feb. 6, 2018, 14 pages.

Japanese Notice of Reasons for Rejection, for Patent Application No. 2017-52315, dated Feb. 12, 2019, 3 pages.

Partial English translation of the Chinese Notification of the First Office Action, for Patent Application No. 201580041169.4, dated Apr. 3, 2018, 8 pages.

Partial English translation of Examination Report issued in German Application No. 11 2015 003 443.9, dated Apr. 30, 2018, 6 pages.

Partial English translation of the Japanese Notice of Reasons for Rejection, for Patent Application No. 2017-525315, dated Feb. 12, 2019, 6 pages.

German Notification of an Office Action, for Patent Application No. 11 2015 003 443.9, dated Jan. 25, 2021, 7 pages.

* cited by examiner

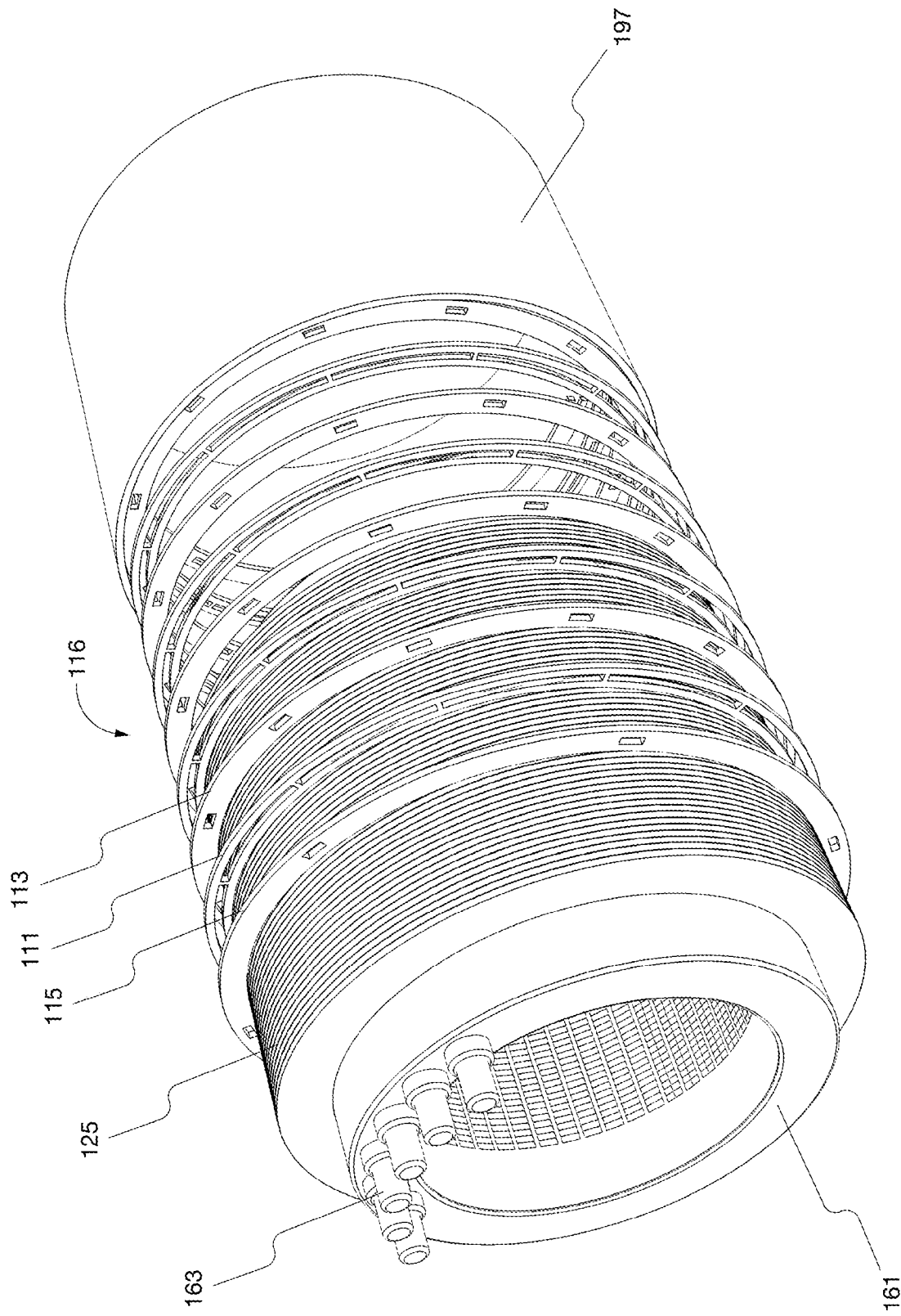

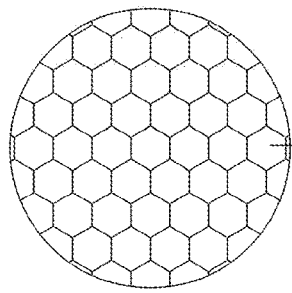
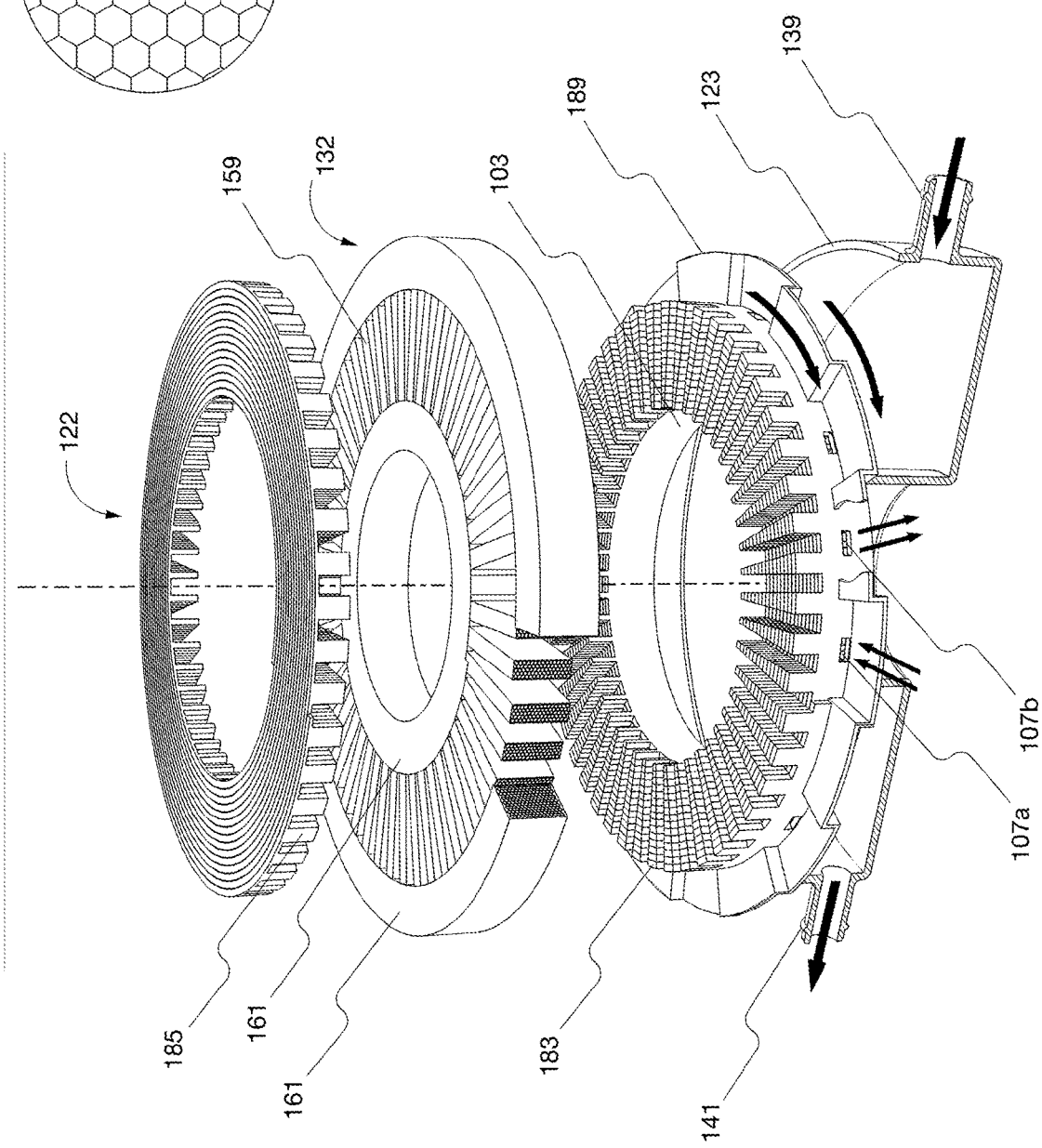
FIG. 16b
FIG. 16a

WOUND STRIP MACHINE

CROSS-REFERENCE TO RELATED APPLICATION(S)

The present application is a continuation-in-part of U.S. patent application Ser. No. 16/114,057, filed Aug. 27, 2018, entitled "WOUND STRIP MACHINE", which is a continuation-in-part of U.S. patent application Ser. No. 14/807,697, filed Jul. 23, 2015, entitled "FLUID-COOLED WOUND STRIP STRUCTURE", which claims priority to and the benefit of U.S. Provisional Application No. 62/029,357, filed Jul. 25, 2014 entitled "FLUID-COOLED WOUND STRIP STRUCTURE"; the entire content of all of the documents identified in this paragraph is incorporated herein by reference.

FIELD

One or more aspects of embodiments according to the present disclosure relate to electric machines, and more particularly to electric machines including wound strip structures.

BACKGROUND

In the manufacturing of electric machines, such as electric motors, the cost of fabricating rotor cores and stator cores may be significant, and in the operation of such machines, heating due to various loss mechanisms may be a mechanism limiting the performance of the machine. As such there is a need for improvements in the design of rotor and stator cores for electric machines.

SUMMARY

Aspects of embodiments of the present disclosure are directed towards a system for cooling both induction and permanent magnet machines which enables specific power levels in excess of 10 kW/kg for machines in the range of 10 kW to 1000 kW. In addition to the enablement of high continuous specific power, the present disclosure also enables reduced cost, especially for high pole-count designs, by reducing material waste associated with the core structure, while enabling more rapid fabrication of the same.

In order to achieve these very high specific power levels, stator and rotor current densities may be maintained on the order of 1500 A/cm$^2$. The resulting conductor and core specific losses are respectively on the order of 5 W/cm$^3$ and 1 W/cm$^3$. In the case of permanent magnet machines, similar specific power levels can be achieved where stator current densities are maintained on the order of 1500 A/cm$^2$ and where gap peak flux densities are maintained on the order of 1 Tesla.

In order to handle these high specific levels of heat production, the specific heat transfer may be on the order of 0.1 W/cm$^3$/C (averaged over the machine active volume). A technique has been developed, termed "capillary cooling", which provides heat transfer from either laminated or strip-wound cores which is well in excess of 0.1 W/cm$^3$/C. More specifically, repeating apertures are punched in the magnetic strip used for the stator core. When wound, these apertures partly align such that coolant paths are formed having a thickness dimension which is equal to the strip thickness or a multiple of the strip thickness. By applying this heat transfer technique to wound-strip stator cores, a variety of machine types can be implemented wherein material waste is reduced and power density is significantly increased.

The new stator core construction applies for both induction and permanent magnet type machines; stator designs are nearly identical for these two machine types. For each of these machine types, radial-gap and axial gap designs are identified which are based on the new strip-wound concept. Within the subset of radial-gap designs, both conventional and inside-out designs are provided. Furthermore, for both the conventional and inside-out radial gap designs, single piece and two-piece coaxial strip-wound core designs are identified. Finally, for axial gap designs, single piece and two-piece strip wound core designs are identified which include the capillary cooling technique. Inside-out machines may be useful as wheel motors and as propeller motors for electric aircraft.

In one embodiment of the present invention there is provided a radial-gap machine stator core formed from an edge-wound strip of ferromagnetic material. Prior to winding of the wound strip, repeating slots and repeating apertures are stamped into the strip, such that upon winding of the wound strip, a cylinder is formed which includes fully aligned winding slots (i.e., slots in the wound strip structure for accommodating a winding, e.g., a stator winding) which point radially inward, and partly aligned apertures which form coolant channels wherein a significant portion have a thickness dimension which is equal to the strip thickness or a multiple thereof. With the addition of coolant manifolds at both ends of the core, coolant can be introduced and collected from the coolant channels within the core. This constitutes a radial-gap stator core which may be used for induction or permanent magnet machines. For both the conventional and inside-out designs, high pole-count designs may be used since the back-iron thickness is then relatively small—thus simplifying the edge-bending process. Furthermore, with high pole-count stators, strip-wound designs typically incur less material waste than stator designs which use stacked laminations.

In another embodiment of the invention, a similar radial-gap stator core is formed from an edge-wound magnetic strip, but where the winding slots face radially outward, rather than inward. Cooling details and details of the stator winding may be similar for the two designs. With the slots facing radially outward, the core is suitable for an inside-out stator wherein the rotor is external to the stator and rotates about, rather than within the stator. For both the conventional and inside-out designs, high pole-count designs may be used since the back-iron thickness is relatively small—thus simplifying the edge-bending process.

In another embodiment of the invention, a radial-gap stator core is formed from two concentric edge-wound magnetic strips, where the inner strip includes winding slots which face radially outward, while the outer wound strip provides the back-iron and cooling functions. Repeating apertures included in the outer strip partly align such that cooling channels are formed as described earlier. With this design, winding slots are closed with respect to the bore. This has the advantage that tooth tip losses are reduced. Furthermore, since bending takes place on the thin "bridge" elements between adjacent teeth, edge-bending for the inner member is relatively simple. Winding of the wound strip is also simplified since the wire slots are fully open and face radially outward. As such, it is possible to apply a preformed winding to the wire slots—which may have further benefits such as improved packing factor and improved heat transfer within the winding. In turn the performed winding maybe formed from multiple strands which are compacted. This may be achieved through the use of a two piece die prior to the insertion of the winding. In some embodiments, the wire strands may also include a thermally set epoxy on them such that when current is applied the winding strands fuse together to form a busbar—like structure.

Non-oriented ferro-magnetic material may be used for both core sections. Alternatively, magnetic performance can be improved where grain-oriented ferro-magnetic materials are used. Back-iron performance is improved in the case where the grain orientation vector aligns with the direction of the back-iron strip—thus increasing permeability and magnetic saturation withstand, while reducing losses. Likewise magnetic performance of the tooth element is improved in the case where the grain orientation vector aligns with the radius vector.

In another embodiment, the two-piece radial-gap stator core design can be applied to an inside-out design. In this case, the inner edge-wound core element provides the functions of back-iron and cooling. The outer edge-wound core element includes inward facing slots. The periphery of the outer wound core faces the bore. Application of the winding is simplified in that the winding slots are fully open. Grain-oriented materials can again be used to improve magnetic performance—as mentioned above.

In another embodiment, an axial-gap stator core is formed from a tape-wound ferro-magnetic strip. Slots, punched along an edge, align when wound to form wire slots and teeth. Apertures punched within the back-iron region, partly align when wound to form cooling channels. Manifolds added at the O.D. and I.D. of the wound-strip complete the coolant flow circuit. A conventional or bus winding may be applied to the winding slots.

In another embodiment, a similar axial-gap stator core is formed from a tape-wound strip with the addition of O.D. and I.D. manifolds. Two partitions segregate the O.D. manifold into two 180 degree sectors such that inlet flow is constrained to the first sector, while outlet flow is constrained to the second sector. The I.D. manifold serves to redirect radially inward flow received from the first sector to radially outward flow into the second sector.

In another embodiment, a similar-axial gap stator core is formed from a tape-wound strip and only a single O.D. manifold is used in combination with a flow-director. The flow-director serves to separate inlet and outlet flow such that odd numbered apertures in the wound-strip O.D are contiguous with a fluid inlet, while even numbered apertures are contiguous with a fluid outlet. Flow between inlet and outlet channels is directed through multiple thin azimuthal or capillary channels such that efficient heat transfer between the core and coolant results.

In another embodiment, an axial-gap stator core is formed from two mating tape-wound strips, where one strip forms the back-iron element which includes the apertures which form cooling channels, and a second wound-strip which forms the tooth element. With this approach, the winding slots within the tooth element are fully open—thus allowing for the insertion of a pre-formed winding, which may have further benefits such as improved packing factor and improved heat transfer within the winding. In turn the performed winding maybe formed from multiple strands which are compacted. This may be achieved through the use of a two piece die prior to the insertion of the winding. The closed surface in the tooth strip faces the rotor gap and as such, tooth tip losses may be reduced as compared with conventional cases where wire slots exist between the teeth. The two core halves may be bonded together via a resin such as an epoxy resin. As with the redial-gap designs, the two core halves may be fabricated from grain-oriented materials such that the grain orientation vectors substantially align with the magnetic vectors.

In another embodiment, an axial-gap stator core is formed from two mating tape-wound strips, where one strip forms the back-iron element which includes edge notches such that a portion of the winding notches is included. The back-iron element also includes the cooling apertures which partly align to form the cooling channels. The second wound strip includes the remainder of the tooth and slot structures. The advantage of this design is that the mechanical bonding between the two core halves may be improved due to reinforcement caused by the winding. This is especially the case where bus windings are used.

According to an embodiment of the present disclosure, there is provided an electric machine including one or more face wound strips including a first strip, the one or more strips having a plurality of openings, the first strip having a plurality of turns, an opening of a turn of the first strip overlapping an opening of an adjacent turn, to form a portion of a fluid channel of a plurality of fluid channels, the turn and the adjacent turn abutting against each other at the overlapping openings.

In some embodiments, the electric machine is an axial gap electric machine.

In some embodiments, a subset of the openings are narrow and a subset of the openings are wide.

In some embodiments, the electric machine includes: a stator having a stator core including the one or more face wound strips, and a rotor, the rotor having a fluid passage.

In some embodiments, the electric machine further includes a manifold having a manifold channel in fluid communication with the fluid channel.

In some embodiments, the electric machine further includes a flow director.

In some embodiments, the electric machine includes the first strip and a second strip co-wound with the first strip.

In some embodiments: the one or more face wound strips further include a second strip, the first strip has a plurality of substantially identical openings, the second strip has a plurality of substantially identical openings, and an opening of the first strip differs in shape and/or size from an opening of the second strip.

In some embodiments, the electric machine further includes a sealant between the turn and the adjacent turn, and/or within a fluid channel of the plurality of fluid channels.

In some embodiments: the one or more face wound strips further include a second strip concentric with the first strip, wherein: the first strip is configured as a back-iron portion of a stator core of the electric machine; and the second strip has a plurality of teeth, and is configured as a tooth portion of the stator core.

In some embodiments, the electric machine further includes bonding agent and/or thermal interface agent, between the first strip and the second strip.

In some embodiments, the electric machine further includes an enclosure, wherein a portion of an interior surface of the enclosure forms a portion of wall of a fluid channel of the plurality of fluid channels.

In some embodiments, the electric machine further includes a winding, wherein a portion of the winding includes insulated conductors packed with a void fraction of less than 12%.

In some embodiments, the electric machine further includes a stator core including the one or more face wound strips, the electric machine further including a winding, and a potting compound, filling a void between the stator core and the winding, the potting compound having a thermal conductivity of at least 0.5 W/K/m.

In some embodiments, the first strip is composed of a non-isotropic magnetic material, and the first strip includes a tooth portion of a stator of the electric machine, and a magnetic permeability tensor of the first strip has, within a tooth of the stator, a substantially radial eigenvector, the substantially radial eigenvector corresponding to a greatest eigenvalue of the magnetic permeability tensor of the first strip; or the first strip includes a back-iron portion of a stator of the electric machine, and a magnetic permeability tensor of the first strip has, within the back-iron portion of the stator, a substantially azimuthal eigenvector, the substantially azimuthal eigenvector corresponding to a greatest eigenvalue of the magnetic permeability tensor of the first strip.

In some embodiments, the plurality of fluid channels includes: a first fluid channel, a second fluid channel, and a third fluid channel, the first fluid channel and the second fluid channel both being: substantially axial, or substantially radial, the third fluid channel connecting the first fluid channel and the second fluid channel, the third fluid channel being not parallel to the first fluid channel and the third fluid channel being not parallel to the second fluid channel.

In some embodiments: the first strip includes a back-iron portion of a stator of the electric machine, and a magnetic permeability tensor of the first strip has, within the back-iron portion of the stator, a substantially azimuthal eigenvector, the substantially azimuthal eigenvector corresponding to a greatest eigenvalue of the magnetic permeability tensor of the first strip; and the stator includes a tiled or multi-piece tooth portion, wherein a magnetic permeability tensor of the tooth portion has a substantially radial eigenvector, the substantially radial eigenvector corresponding to a greatest eigenvalue of the magnetic permeability tensor of the tooth.

In some embodiments, the electric machine further includes: a first manifold around the outside of a first face wound strip of the one or more face wound strips, and a second manifold inside the first face wound strip, the second manifold being in fluid communication with the first manifold.

In some embodiments, the electric machine further includes: a first manifold around a first portion of the outside of a first face wound strip of the one or more face wound strips, a second manifold around a second portion of the outside of the first face wound strip, and an interior flow cavity inside the first face wound strip, wherein the electric machine is configured to cause fluid flowing into an inlet port of the first manifold to flow: through the first face wound strip into the interior flow cavity, and from the interior flow cavity through the first face wound strip into the second manifold.

In some embodiments, the electric machine includes a magnetic core including: a first core portion including the one or more face wound strips; and a second core portion, coaxial with and abutting against the first core portion.

In some embodiments, the one or more face wound strips are configured to provide a specific heat transfer of between 0.02 W/cm$^3$/C and 1 W/cm$^3$/C.

In some embodiments, the electric machine further includes: a first manifold extending around the outside of a first face wound strip of the one or more face wound strips, a second manifold extending around the outside of the first face wound strip, and wherein: the openings form a plurality of feed passages and a plurality of cooling passages, the first manifold and the second manifold are configured to cause fluid flowing into an inlet port of the first manifold to flow: inward through a first subset of the feed passages, through the cooling passages to a second subset of the feed passages, and from the second subset of the feed passages to an outlet of the second manifold.

According to an embodiment of the present disclosure, there is provided an electric machine fluid cooling jacket including: one or more face wound strips, a plurality of fluid channels, and a manifold; the one or more face wound strips including a first strip, the one or more face wound strips having a plurality of openings, the first strip having a plurality of turns, an opening of a turn of the first strip overlapping an opening of an adjacent turn, to form a portion of a fluid channel of the plurality of fluid channels, the turn and the adjacent turn abutting against each other at the overlapping openings, and the manifold having a manifold channel in fluid communication with the plurality of fluid channels.

BRIEF DESCRIPTION OF THE DRAWINGS

These and other features and advantages of the present disclosure will be appreciated and understood with reference to the specification, claims, and appended drawings wherein:

FIG. 10 is an exploded perspective view of a two-piece strip wound radial-gap stator which uses an outer enclosure, according to an embodiment of the present disclosure;

FIG. 11b is an expanded/cut-away view of the FIG. 11a axial-gap stator core which shows details of the cooling apertures, according to an embodiment of the present disclosure;

FIG. 16a is a perspective view of an alternative two-piece wound-strip stator, according to an embodiment of the present disclosure;

FIG. 16b is an enlarged section view of the winding used in FIG. 16a, according to an embodiment of the present disclosure.

DETAILED DESCRIPTION OF THE DRAWINGS

The detailed description set forth below in connection with the appended drawings is intended as a description of exemplary embodiments of a wound strip machine provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1A:
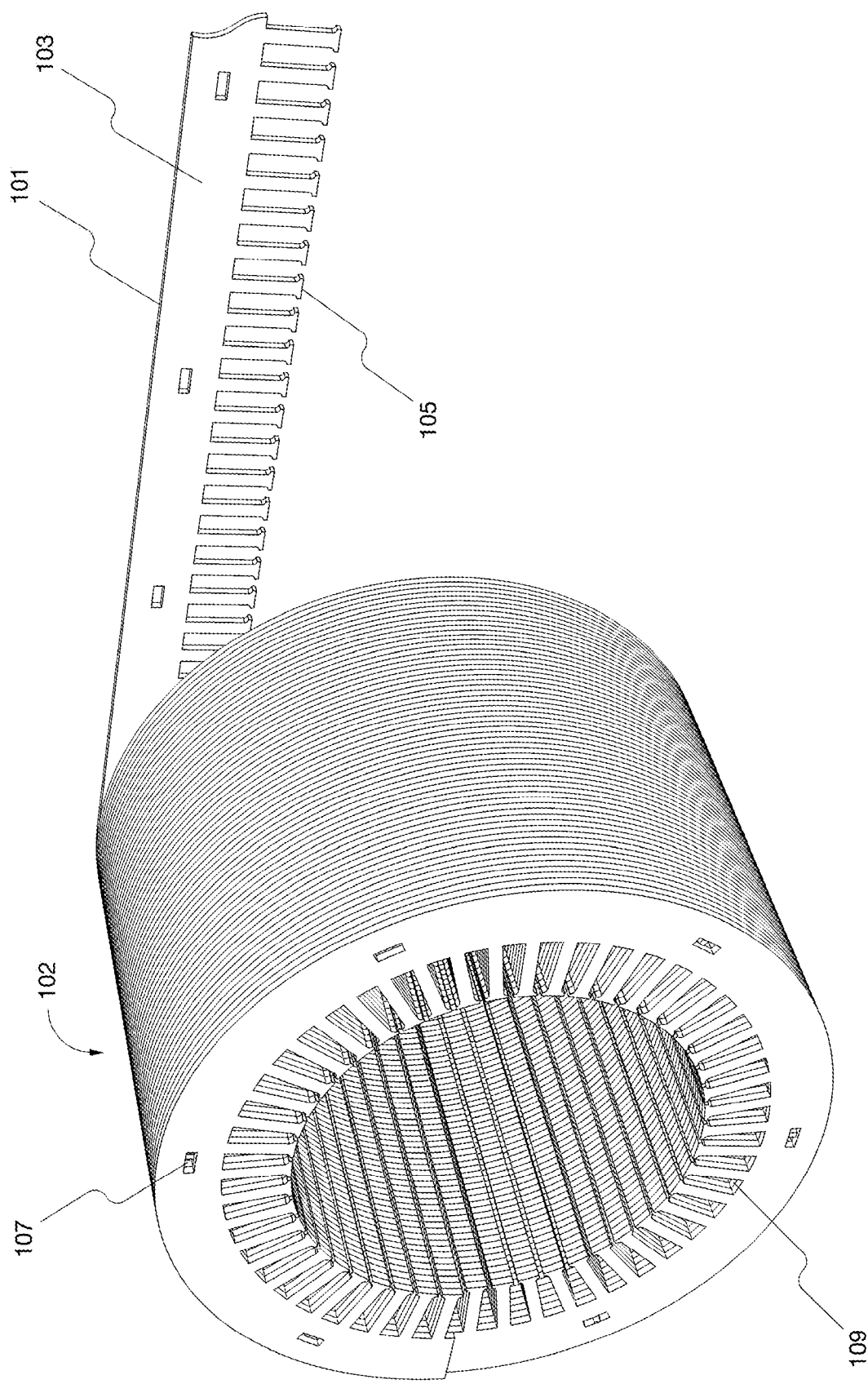
FIG. 1a is a perspective view of a partially formed wound strip machine stator core, according to an embodiment of the present disclosure.

FIG. 1a shows radial-gap machine stator core 102 which is formed by edge-winding ferromagnetic strip 101. Strip 101 is notched such that when wound, conventional teeth 105, winding slots 109, and back-iron 103 portions are formed. Strip 101 also includes repeating apertures 107 which align or partly align, such that cooling channels are formed when wound. Adjacent turns may be bonded together using a resin such as an epoxy. Other techniques such as tig welding or clinches may be used to establish a rigid structure. Stator core 102 can be applied for either induction or permanent magnet machines. In both cases, high pole-count designs may be used so that the back-iron width is relatively small compared with the bending radius thus rendering edge-bending less challenging.

Figure 1B:
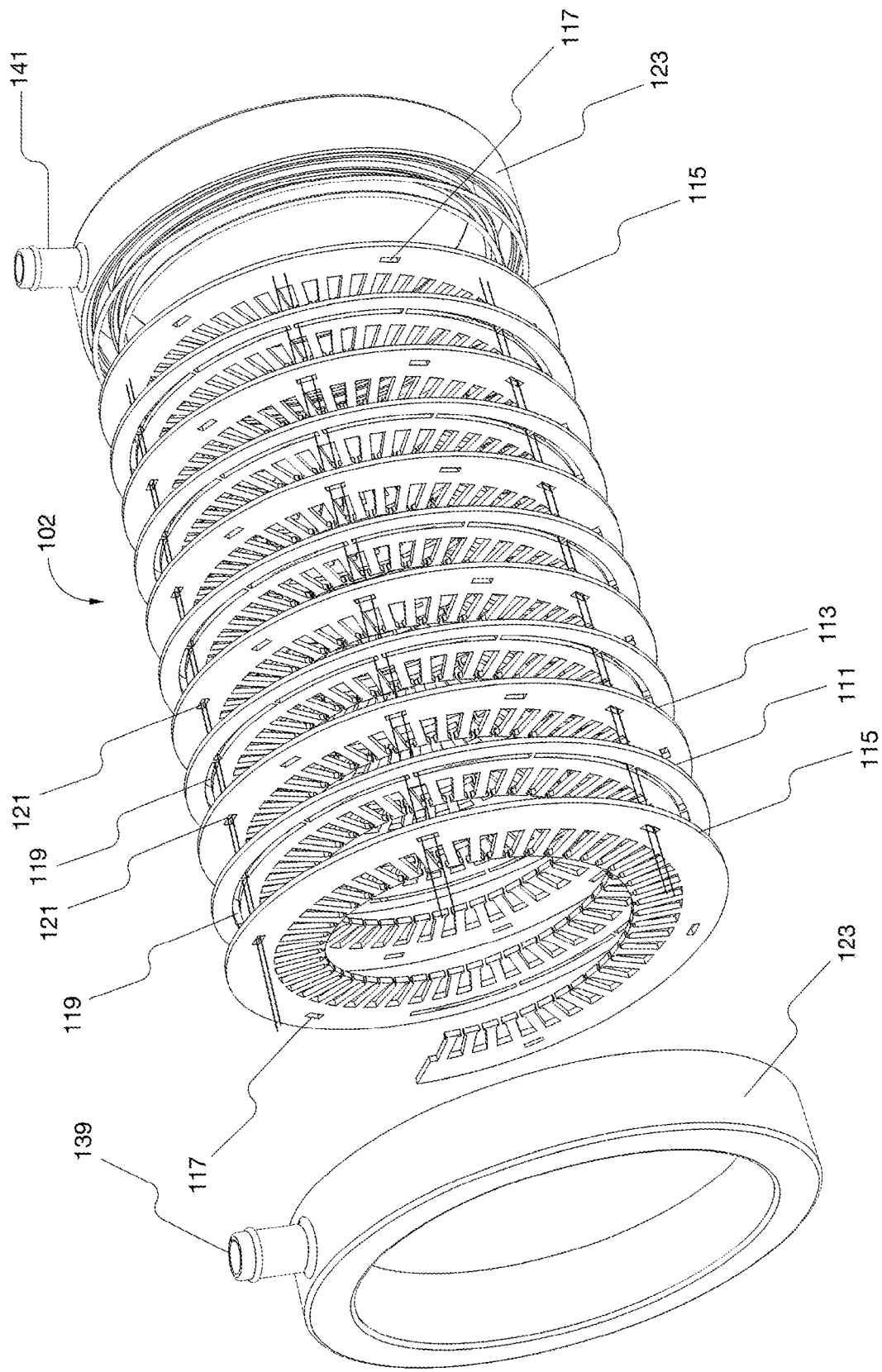
FIG. 1b is an exploded perspective view of the FIG. 1a wound strip stator core, according to an embodiment of the present disclosure.

FIG. 1b is an exploded view of the FIG. 1 radial-gap stator core 102 which shows details in connection with the coolant apertures. The completed structure may be viewed as an N-turn helix, where each turn starts and ends at a defined angular position. Three types of turns are defined—designated type 1 (111), type 2 (113) and type 3 (115). The sequence of turn types is 3, 1, 2, - - - 1, 2, 3. Type 1 turns have 2 m of relatively wide apertures; type 2 turns have 2 m of relatively narrow apertures and type 3 turns have m of relatively narrow apertures, where m is a positive integer. When wound, apertures from type 1 and type 2 turns partly align such that flow paths are created which are substantially azimuthal. One type 3 turn is used at a first end of core 102 and serves to restrict inlet flow to odd numbered apertures (or at least impede the flow to even numbered apertures). A second type 3 turn is used at a second end of core 102 and serves to restrict outlet flow to even numbered apertures. Coolant flow is distributed to the first end of core 102 by a first manifold 123 and is received from the second end of core 102 by a second, similar or identical, manifold 123. The first manifold 123 includes an inlet 139 and the second manifold includes an outlet 141.

Figure 1C:
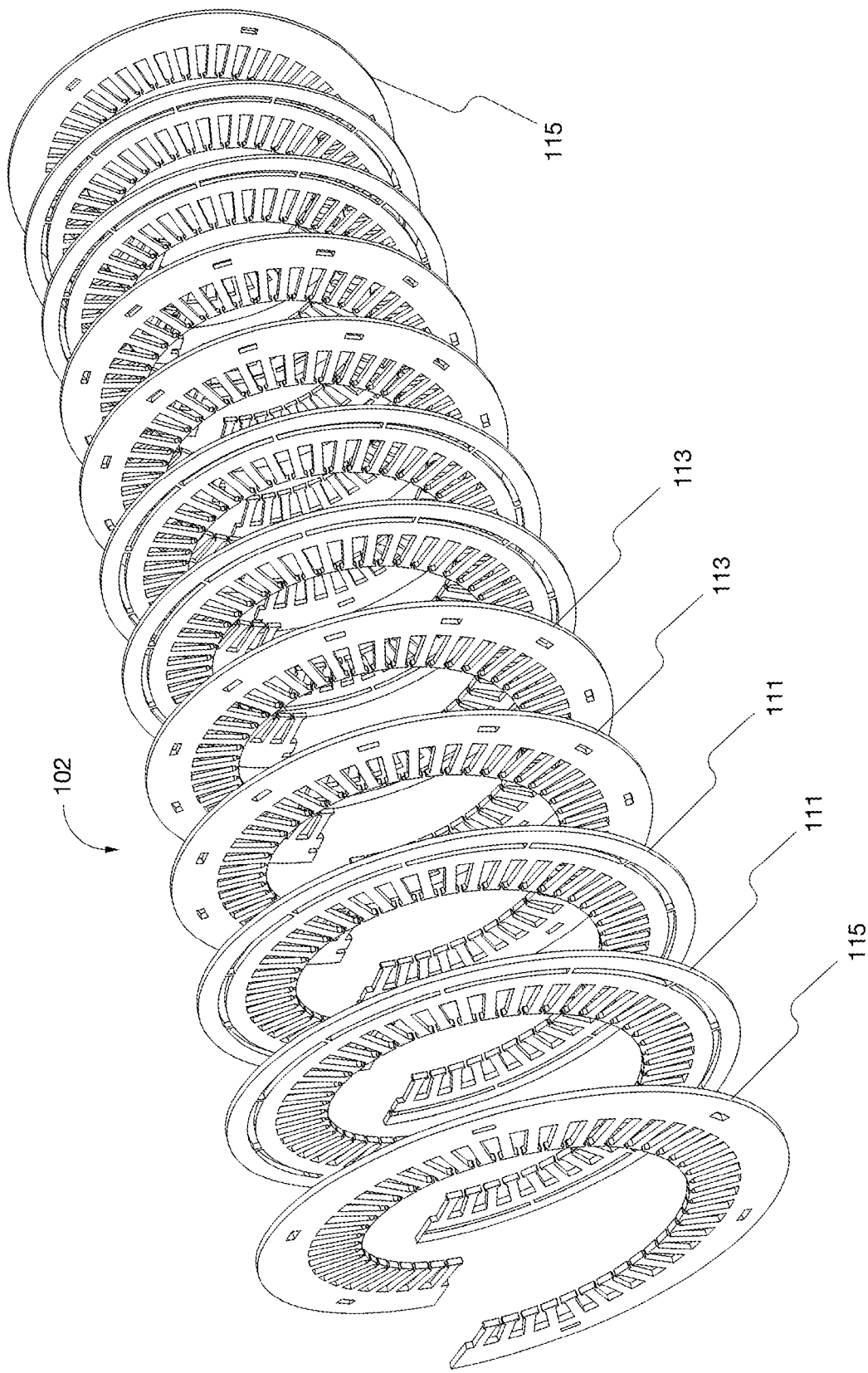
FIG. 1c is an exploded perspective view of a wound strip machine stator core, according to an embodiment of the present disclosure.

In some embodiments a stator core like that of FIG. 1a or of FIG. 1b includes more than one portion each formed of a wound strip; the portions may be coaxial and may abut each other, so that the magnetic and thermal characteristics of the core, and the fluid flow paths within the core, are similar to those of a one-piece stator core like that of FIG. 1a or of FIG. 1b. Such a design may have advantages in yield, for example; a defect in the strip used to form the wound strip structure may result in the discarding of only one portion, instead of resulting in the discarding of the entire core. FIG. 1c shows an example of such a design, in which each portion consists of one turn. In other embodiments each portion may include multiple turns, or less than a full turn, or the portions may have different respective numbers (or fractions) of turns.

Efficient heat transfer between the wound strip and the coolant is achieved due to the fact that the contact area between the coolant and wound strip material is large, while the heat flow distance within the coolant is relatively small. Head loss, which is proportionate to flow length may be held to arbitrarily small values by making m adequately large.

Figure 2:
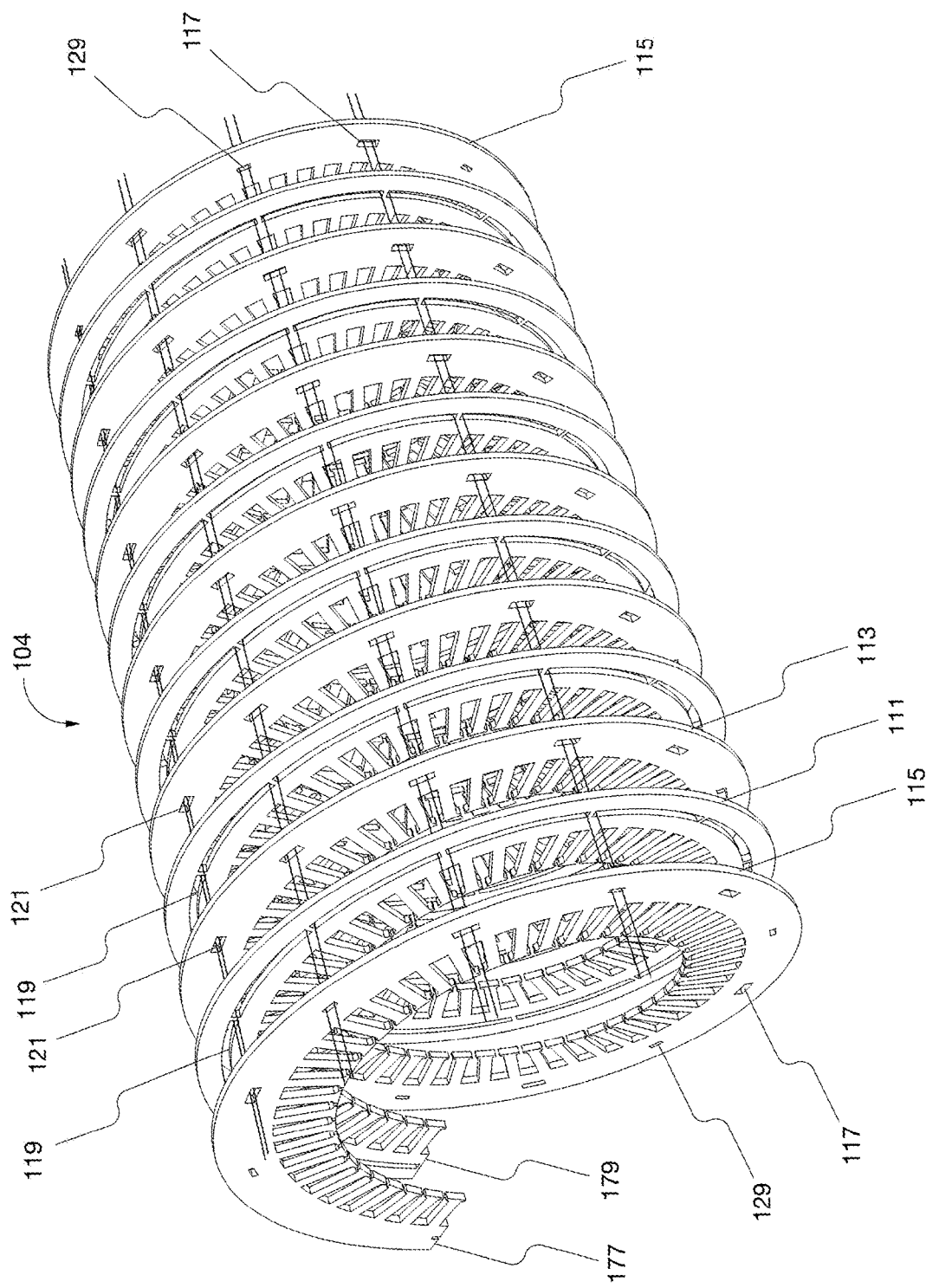
FIG. 2 is an exploded perspective view of a wound strip stator core using two co-wound strips, according to an embodiment of the present disclosure.

FIG. 2 is an exploded view of radial gap stator core 104 which comprises two co-wound ferromagnetic strips—a first wound strip 177 and a second wound strip 179. Wound strips 177 and 179 are notched such that when wound, conventional teeth 105 align as in the case of FIG. 1a. Strips 177 and 179 also include respectively repeating apertures 119 and 121 which align or partly align, such that cooling channels are formed when wound. Apertures 119 may be wide compared to apertures 121 such that azimuthal flow paths are created. Apertures located on the first turn of wound strip 177, designated type 3 (115) may be relatively narrow and/or of reduced number compared to apertures on subsequent turns of strip 179 such that desired flow restrictions are achieved. Likewise, apertures located on the last turn of wound strip 179, designated type 3 (115) may be relatively narrow and/or of reduced number compared to apertures on subsequent turns of strip 177 such that additional desired flow restrictions are achieved.

Figure 3:
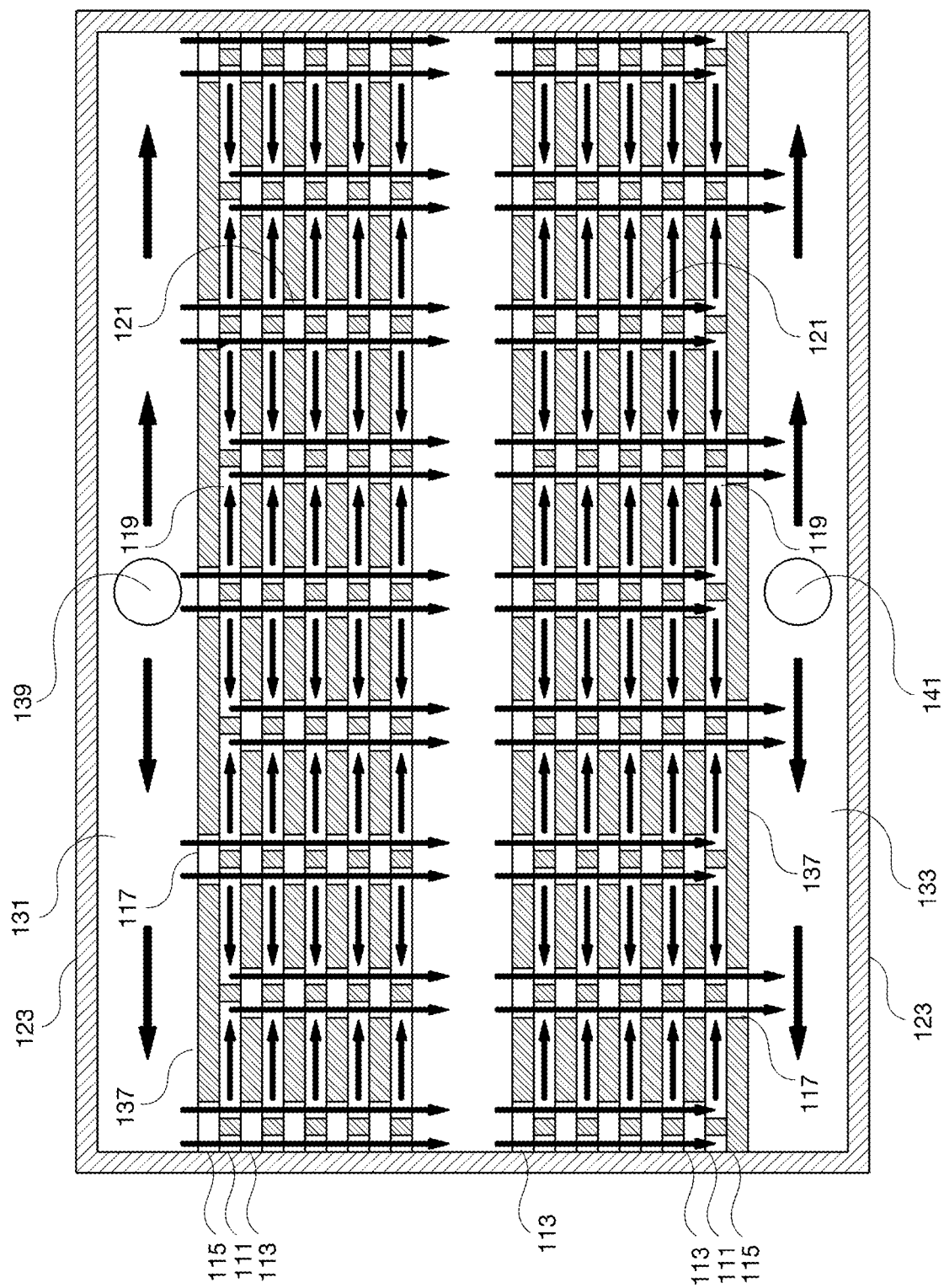
FIG. 3 is a flow diagram which applies to radial-gap stator cores, according to an embodiment of the present disclosure.

FIG. 3 is a flow diagram which applies to radial gap stator cores. The stator core is represented by layers designated 111 (turn type 1), 113 (turn type 2), and 115 (turn type 3)—arranged in the order shown. A first manifold 123 forms an inlet cavity 131 which distributes coolant received from inlet 139 to a first set of flow director apertures 117. From there, fluid flows as shown—such that the entire flow (or at least a significant fraction of the flow) is forced to flow through thin horizontal channels (or "cooling passages") where a substantial amount of the heat transfer takes place. At the bottom end, coolant exiting flow director apertures 117 is then distributed by outlet cavity 133 which is formed by bottom manifold 123. Coolant exits outlet 141.

The fluid channels of FIG. 3 include "feed passages" (e.g., axial channels that are vertical in FIG. 3, or substantially radial channels in an axial gap machine (FIG. 17)) that impose a relatively low resistance to flow per unit length, and "cooling passages" (e.g., azimuthal channels that are horizontal in FIG. 3), which have at least one small transverse dimension (so that the heat flow path to fluid at the center of the cooling channel is short), and the function of which is to provide cooling. The function of the feed passages is to feed coolant to the cooling passages, and to receive the coolant after it passes through the cooling passages. Each cooling passage may connect two feed passages, which may contain fluid at two different respective pressures, so that the pressure difference across the cooling passage causes fluid to flow through it. The cooling passages may have significantly higher (e.g., ten times higher, or more) resistance to flow than the feed passages. In FIG. 3, a plurality of feed passages extends nearly all the way through the structure, one half of them being blocked at one end by a turn with half as many apertures as there are feed passages, and the other half being similarly blocked at the other end.

As used herein, a "flow director" is any structure (such as a type 3 turn in FIG. 3), secured to a plurality of feed passages, that prevents fluid from flowing from a manifold into (or out of) some or all of the feed passages (or that impedes such fluid flow), and that may allow fluid to flow into (or out of) other feed passages, if any. FIG. 2 shows an embodiment in which a flow director (the first turn of the first wound strip 177) does not entirely block every other feed passage, but instead partially blocks them, impeding flow into or out of them, by providing a smaller aperture 129 for fluid flow into our of these feed passages than the flow director apertures 117 that allow fluid to flow into or out of the other feed passages. In some embodiments the flow director impedes flow into the blocked or partially blocked apertures to a sufficient extent that a pressure drop sufficient to drive coolant through the cooling passages is present across the cooling passages. The flow director may be a turn of the wound strip structure (e.g., as illustrated in FIG. 2), or it may be another structure that causes an impediment to fluid flow into or out of a subset of the feed passages. For example, one embodiment may be similar to that of FIG. 2, with the turns of the first wound strip all being identical (instead of the first turn having apertures of different sizes) and a subset of the apertures of the first turn (or of a turn near one end of the wound strip structure) may be blocked or partially blocked (e.g., by plugs (e.g., resin plugs), or by protrusions that are part of an adjacent structure such as a manifold).

Other configurations may be employed to similar effect. For example, in some embodiments, first feed passages extend nearly halfway through the structure from the first manifold and are blocked (or restricted) near the center of the structure, and second feed passages extend nearly halfway through the structure from the second manifold and are blocked (or restricted) near the center of the structure. The second feed passages may be collinear with (but not connected to) the first feed passages. Third feed passages, alternating with the pairs of first and second feed passages, may extend nearly to both ends of the structure; each of the third feed passages may be blocked at both ends of the structure. In such a structure fluid may flow in axially through one of the first feed passages, azimuthally through a first plurality of cooling passages to one adjacent third feed passage on one side of the first feed passage, and similarly to another third feed passage on the other side of the first feed passage. The fluid may then flow from the third feed passage through other pluralities of azimuthal cooling passages to second feed passages, and then axially through the second feed passages to an outlet manifold.

Figure 4:
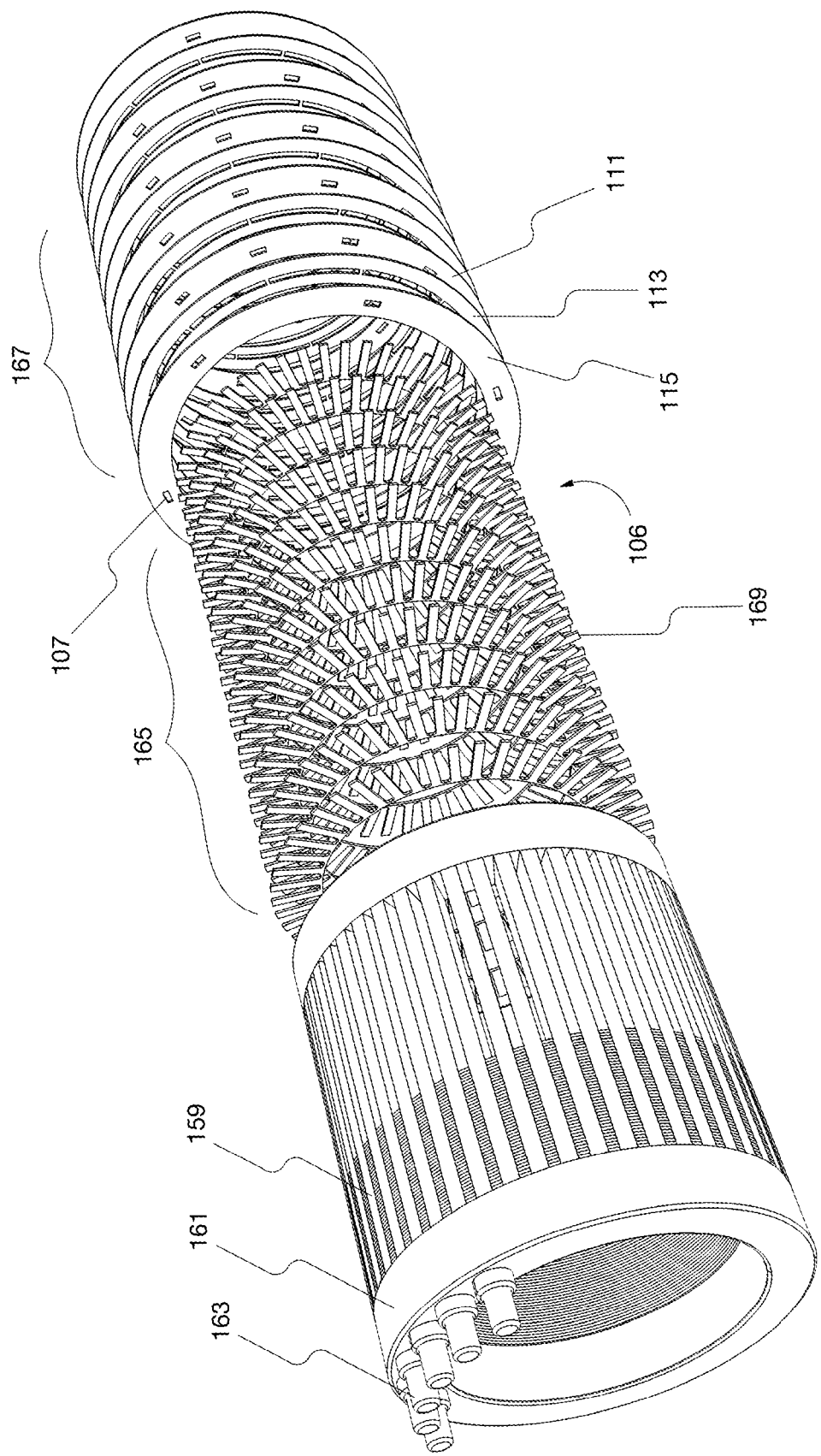
FIG. 4 is an exploded view of a radial gap stator formed by two concentric wound strips, according to an embodiment of the present disclosure.

FIG. 4 illustrates radial-gap stator 106 which is formed by two concentric wound strips—inner wound strip 165 and outer wound strip 167. Inner wound strip 165 includes stator teeth 169 which face radially outward—thus allowing simplified insertion of the winding and at the same time providing thin "bridge" sections at the bore. In turn, the bridge sections serve both to connect the teeth, to form a strip, and may reduce tooth-tip losses thus improving efficiency while reducing tooth tip temperatures. With this construction, a pre-formed winding can be installed into the winding slots.

Outer wound strip 167 provides the back-iron function and also provides heat transfer to coolant flow. An inlet manifold (not shown) located at one end of the outer wound strip distributes inlet flow, while a second manifold (not shown) collects outlet flow from the opposite end of the outer wound strip. The repeating arrangement of turn types 1, 2, and 3 is identical to that discussed under FIG. 3.

The winding may be conventional and may be achieved by either the use of multiple strands of parallel connected round wire or by use of formed buses. In the former case, stator teeth may be of constant cross section with slot section increasing with radius. In the case where bus windings are used, tooth width may increase with radius such that tooth slot width is independent of radial distance. End turns 161 and active elements 159 are formed as shown. Six winding terminals 163 are shown which is consistent with three independent windings. On some embodiments the winding may be potted after being installed on the core.

Figure 5:
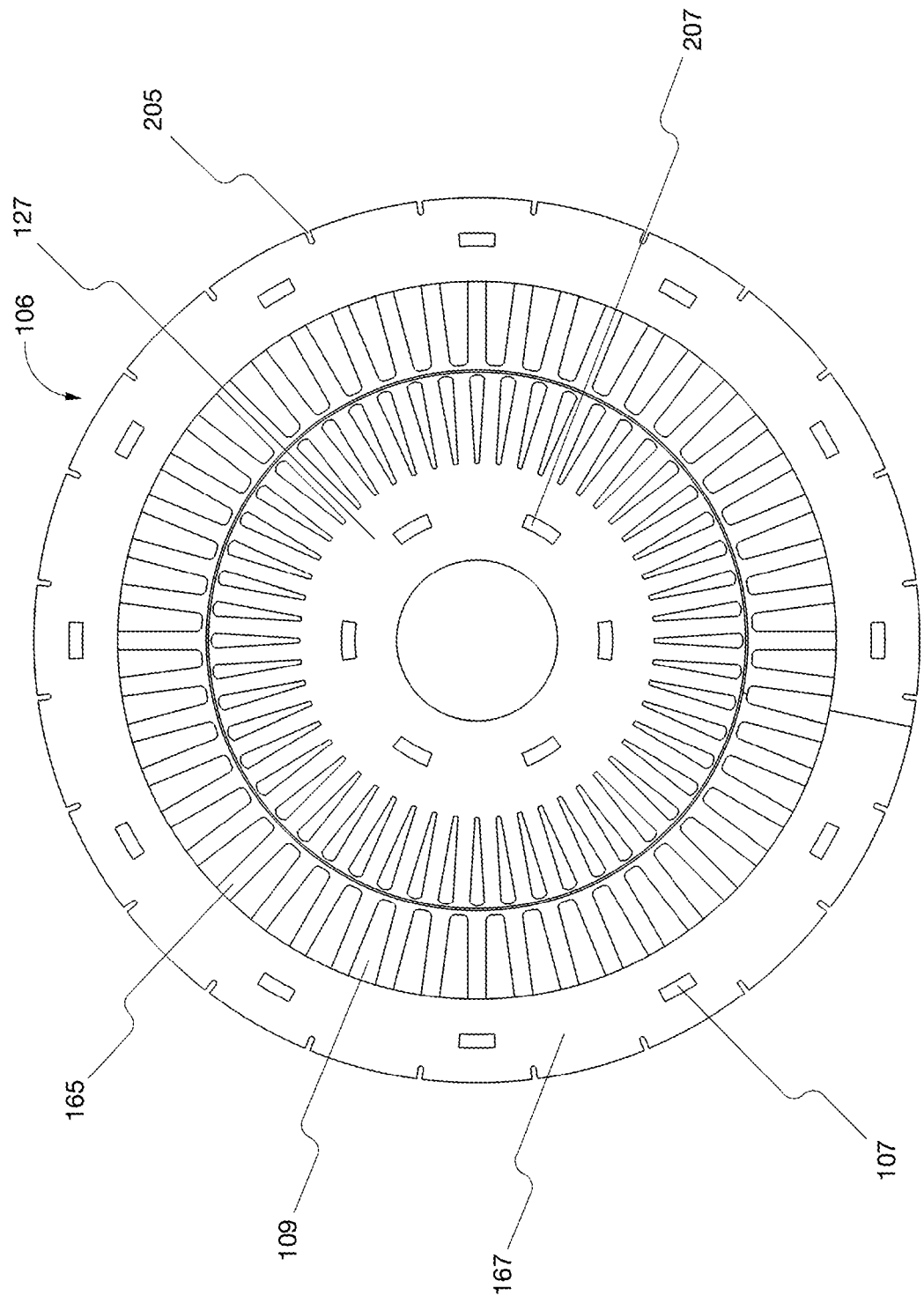
FIG. 5 is a section view of the stator and rotor cores of an induction machine which uses the FIG. 4 stator, according to an embodiment of the present disclosure.

FIG. 5 shows core section 106 of an induction machine which uses the two-piece strip-wound stator core of FIG. 4. In turn, the stator core consists of inner wound strip 165 and outer wound strip 167. The inner wound strip includes winding slots 109 which may receive a conventional winding or preformed winding. Outer wound strip 167 includes apertures 107 which either align or partly align with successive turns to form cooling channels. Outer wound strip 167 also serves as the back-iron portion of the magnetic circuit. Rotor 127 may consist of stacked laminations which may include apertures which either align or partly align to form cooling channels 207. Bending notches 205 may be added to facilitate edge bending, which may be useful in the case of low pole-count designs where the back iron is relatively thick. Bending notches 205 may be located at either the I.D. or O.D. portions of the wound strip.

Figure 6:
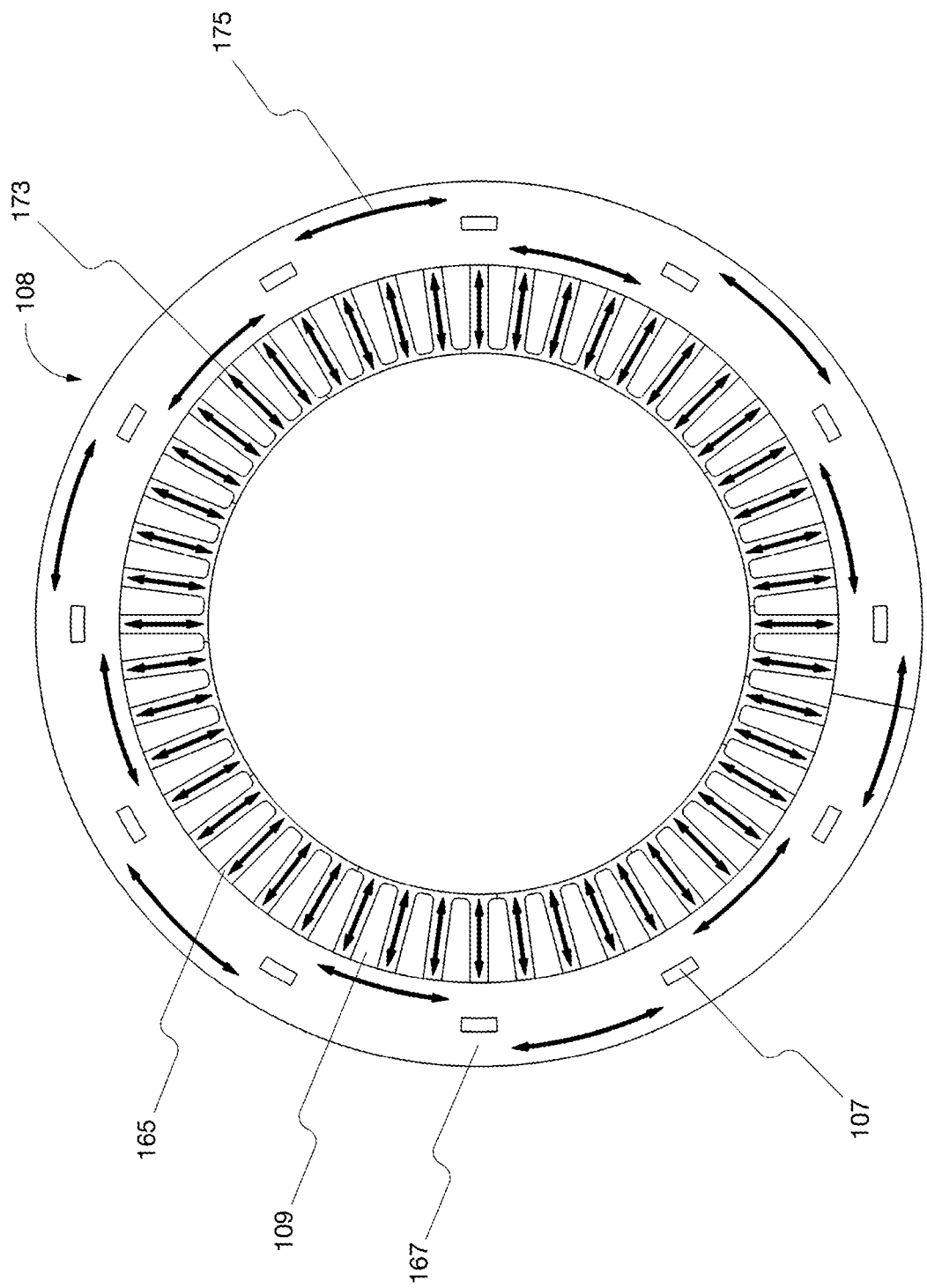
FIG. 6 is a section view of the FIG. 4 stator fabricated from grain oriented magnetic steel, according to an embodiment of the present disclosure.

FIG. 6 shows a specific version of the stator core 108 used in FIGS. 4 and 5 wherein both inner wound strip 165 and outer wound strip 167 are fabricated from grain oriented magnetic steel. Such steel may have a magnetic permeability tensor having three eigenvectors and three respective corresponding eigenvalues, and the greatest eigenvalue may correspond to an eigenvector aligned with the grain orientation. For the inner wound strip, grain orientation is perpendicular to the strip length before bending and for the outer wound strip, grain orientation is parallel with the strip length before bending. With this approach, the magnetic vector generally aligns with the grain orientation vector for both tooth 173 and back-iron 175 portions of the stator core. This results in reduced hysteresis losses, increased saturation flux density and increased permeability—which in turn results in improved machine efficiency and power density. It should be noted that conventional single element stator cores may fail to provide grain orientation which aligns correctly for both the tooth and back-iron portions. In some embodiments the tooth portion 173 is a tiled laminated interleaved structure, as illustrated in FIG. 6. An illustration of an analogous structure in which the tooth portion 173 is a single contiguous wound strip would be identical to FIG. 6 except that the lines showing the boundaries between the pieces of the tiled laminated interleaved structure would be absent.

Figure 7:
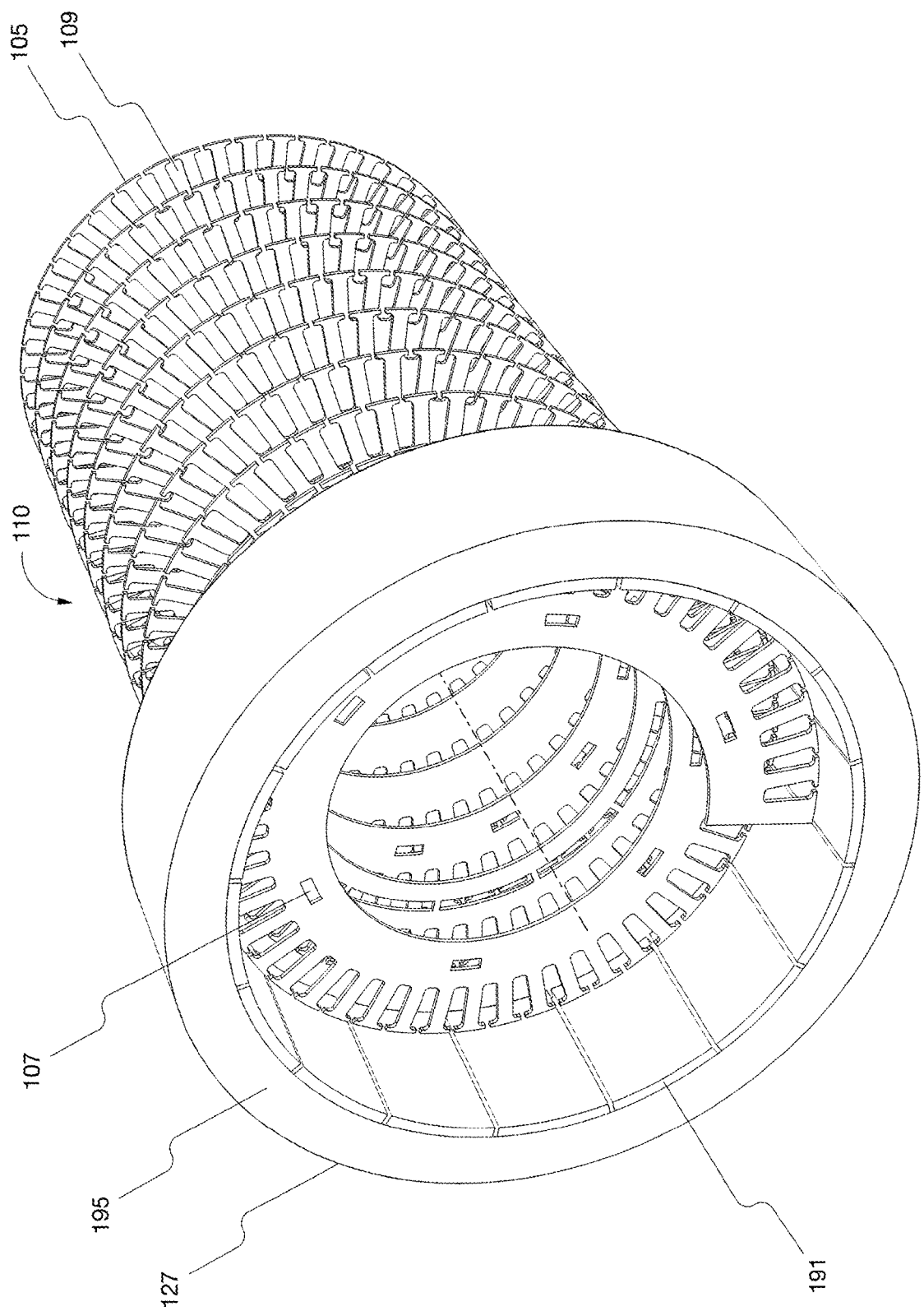
FIG. 7 is an exploded perspective view an inside-out radial gap permanent magnet machine where the stator core is formed from a wound strip, according to an embodiment of the present disclosure.

FIG. 7 illustrates an inside-out radial gap permanent magnet machine 110 where the stator core is formed from a wound strip 101. In turn, wound strip 101 includes evenly spaced slots which fully align when wound to form winding slots 109 and stator teeth 105. Wound strip 101 also includes repeating apertures 107 which partly align to form cooling channels which, in turn, conform to the flow diagram shown in FIG. 3. Coolant is applied to and retrieved from the wound strip via a pair of manifolds (not shown). A conventional winding may be applied to the wound strip core by inserting winding strands into the outwardly facing winding slots. A conventional permanent magnet rotor 127 is shown which includes a yoke 195 and permanent magnets 191. The yoke 195 may be a solid element as illustrated in FIG. 7, or it may instead be a wound strip structure.

Figure 8:
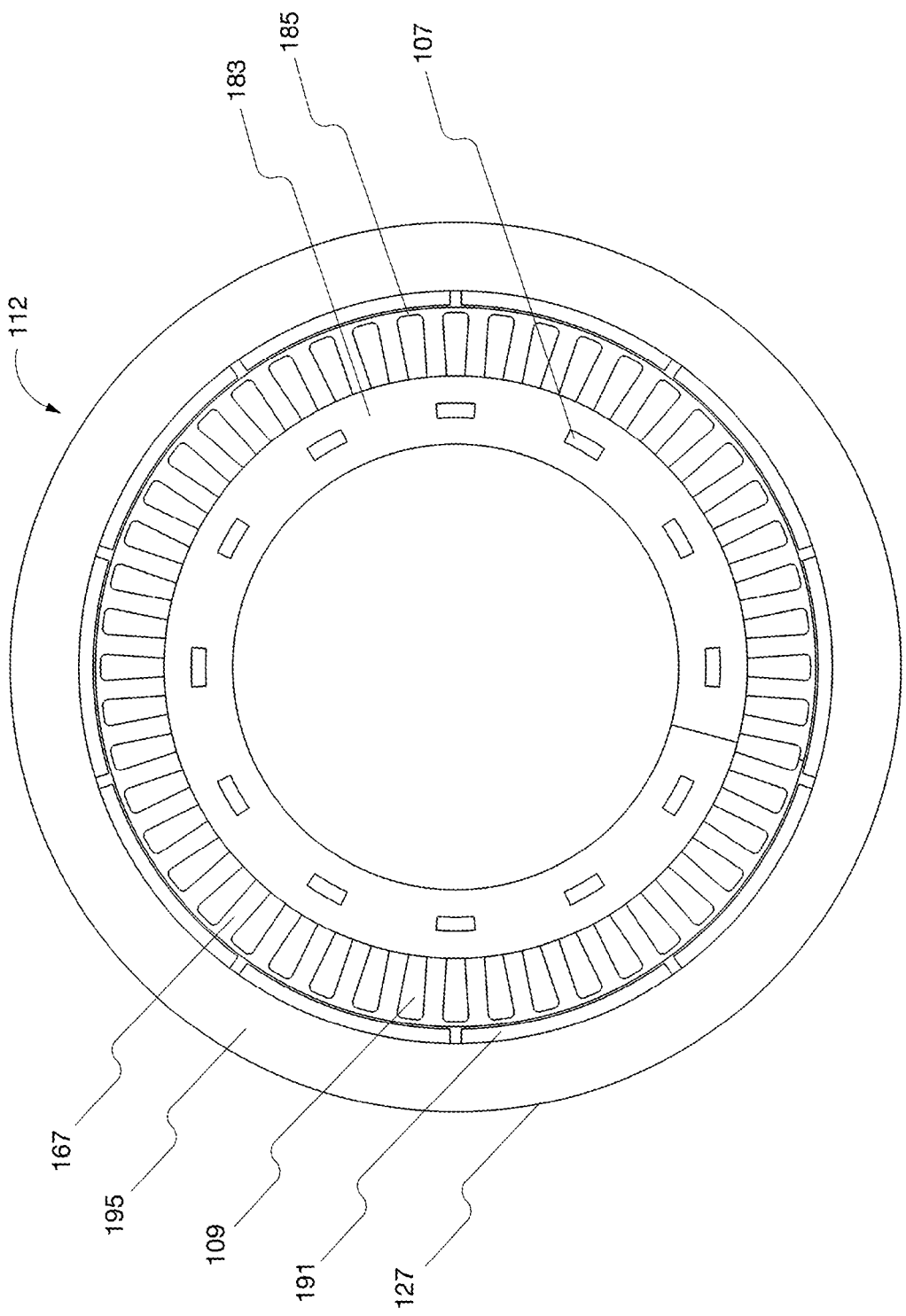
FIG. 8 is a section view of an inside-out permanent magnet machine which uses a two-piece strip-wound stator core, according to an embodiment of the present disclosure.

FIG. 8 illustrates the section of an inside-out permanent magnet machine 112 which uses a two-piece strip wound stator core. With this design, the stator core consists of an inner wound strip back-iron element 183 and an outer wound strip tooth element 167. In turn, back-iron element 183 includes repeating apertures 107 which partly align to form internal cooling ports which conform to the flow diagram of FIG. 3. Wound strip tooth element 167 is fabricated from a ferro-magnetic strip with repeating notches or slots applied to one edge; when wound, these notches align to form slots which receive the winding. In turn, the winding is easily applied as the stator slots are fully open. After the winding is applied, the two stator sections are then brought into concentric assembly. The outer back-iron element may be heated to facilitate assembly.

It should be noted that back-iron element 183 may be difficult to shape, especially for low pole count designs. It such cases, element 183 may be fabricated from conventional stamped laminations. In all cases, tooth element 185 is relatively easy to edge-wind due to the thin sections which adjoin adjacent teeth. As with the arrangement of FIG. 6, grain oriented materials may be used for one or both halves of the stator core to achieve optimal magnetic properties. As with FIGS. 5 and 6 teeth are fully closed with respect to the gap bore. This in turn means that tooth tip losses can be held to relatively low values.

Rotor 127 is similar to that described in connection with FIG. 7.

Figure 9:
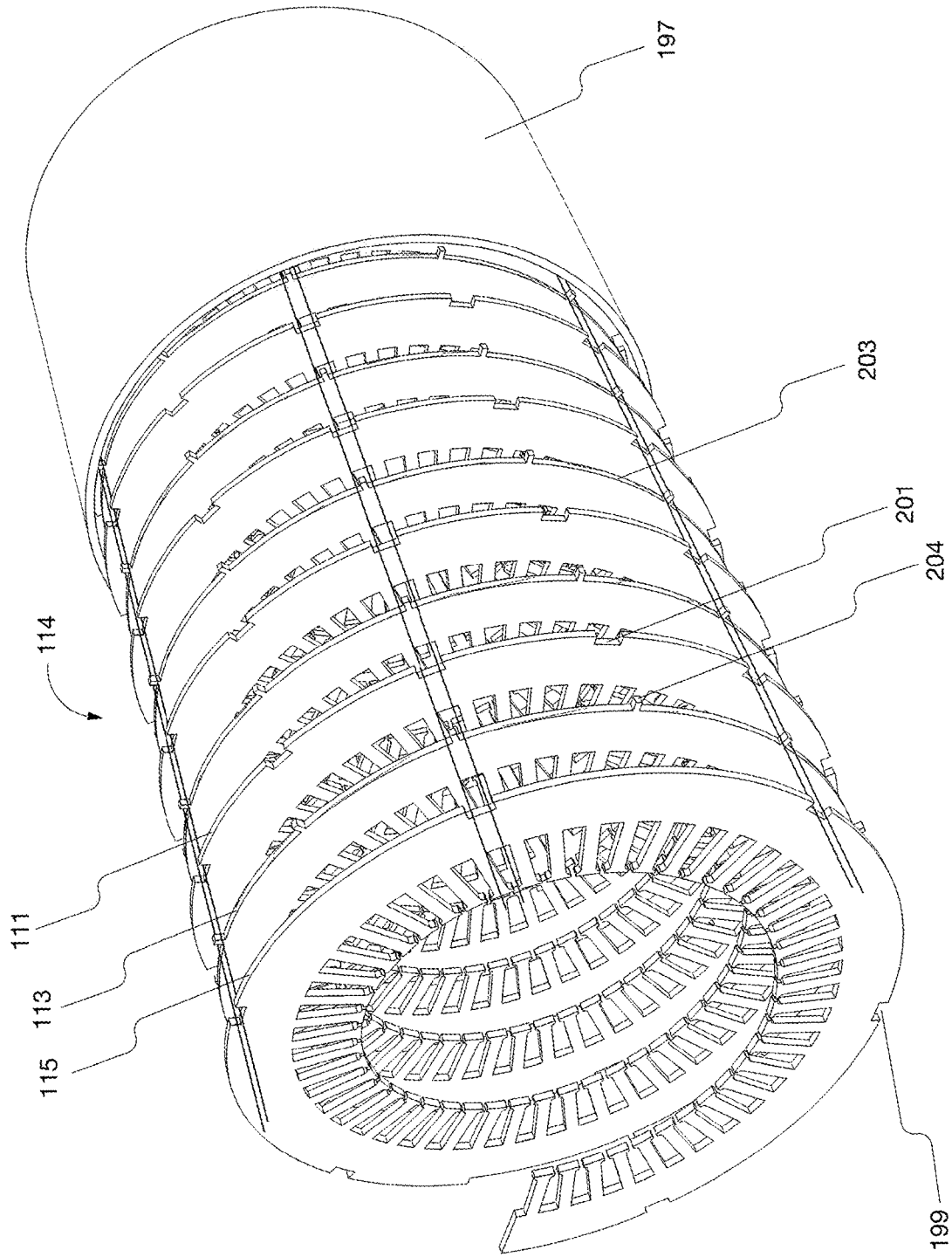
FIG. 9 is an exploded perspective view of a strip-wound stator core where notches are applied to the back-iron strip to form cooling channels, according to an embodiment of the present disclosure.

FIG. 9 illustrates a notch cooled radial gap stator core 114 similar to that of FIG. 8, but where notches as opposed to apertures, are applied to the back-iron strip, and where the inner surface of enclosure 197 completes the flow channels. Specifically, wide notches 203 are applied to turn types 1 (111), narrow notches 201 are applied to turn types 2 (113), and flow director notches 199 are applied to turn types 3 (115). Note that either single piece or two piece stator cores may be used in connection with the notch construction. In the case of the two-piece construction, this approach has the advantage of being easier to edge-bend. It has a slight disadvantage in that the heat flow path length within the back iron is lengthened. The tabs or "webs" 204 shown, in FIG. 9, on the outer perimeter of the type 1 turns separating the wide notches may help to align these turns radially with other turns of the structure, and may be absent if not needed for this purpose. In such an embodiment each type 1 turn may simply have a reduced outer diameter, instead of having a plurality of wide notches separated by webs.

As used herein, an "aperture" in a strip is a hole surrounded on all sides by the material of the strip. A "notch" is a cutout that extends to an edge of the strip so that it is not surrounded on all sides by the material of the strip. Notches may be employed, as mentioned above, to facilitate edge-bending or edge-winding of a strip (in which case they may be referred to as "bending notches"), to form channels in a wound strip structure for accommodating a winding (e.g., a stator winding) (in which case they may be referred to as "winding notches"), or to form fluid channels (e.g., in combination with an enclosure). As used herein, an "opening" refers to either an aperture or a notch.

FIG. 10 illustrates an expanded view of a cooling jacket 116. The wound strip includes three types of turns respectively designated 111, 113, and 115, which are used in an arrangement similar to that described under FIG. 1b. Associated apertures 107 added to the strip partly align such that coolant paths are established which conform to the FIG. 3 flow diagram. The winding may be a conventional winding which includes end turns 161 and where the winding is terminated via terminals 163 which axially project from one end turn. In the case shown, six terminals are shown—which is consistent with a three phase winding which does not include a neutral splice. Such a winding may be externally connected as a wye, delta, or open delta configuration.

Enclosure 197 may be an interference or force fit with cooling jacket 116. In some embodiments, this may be achieved by heating the enclosure prior to assembly.

Figure 11A:
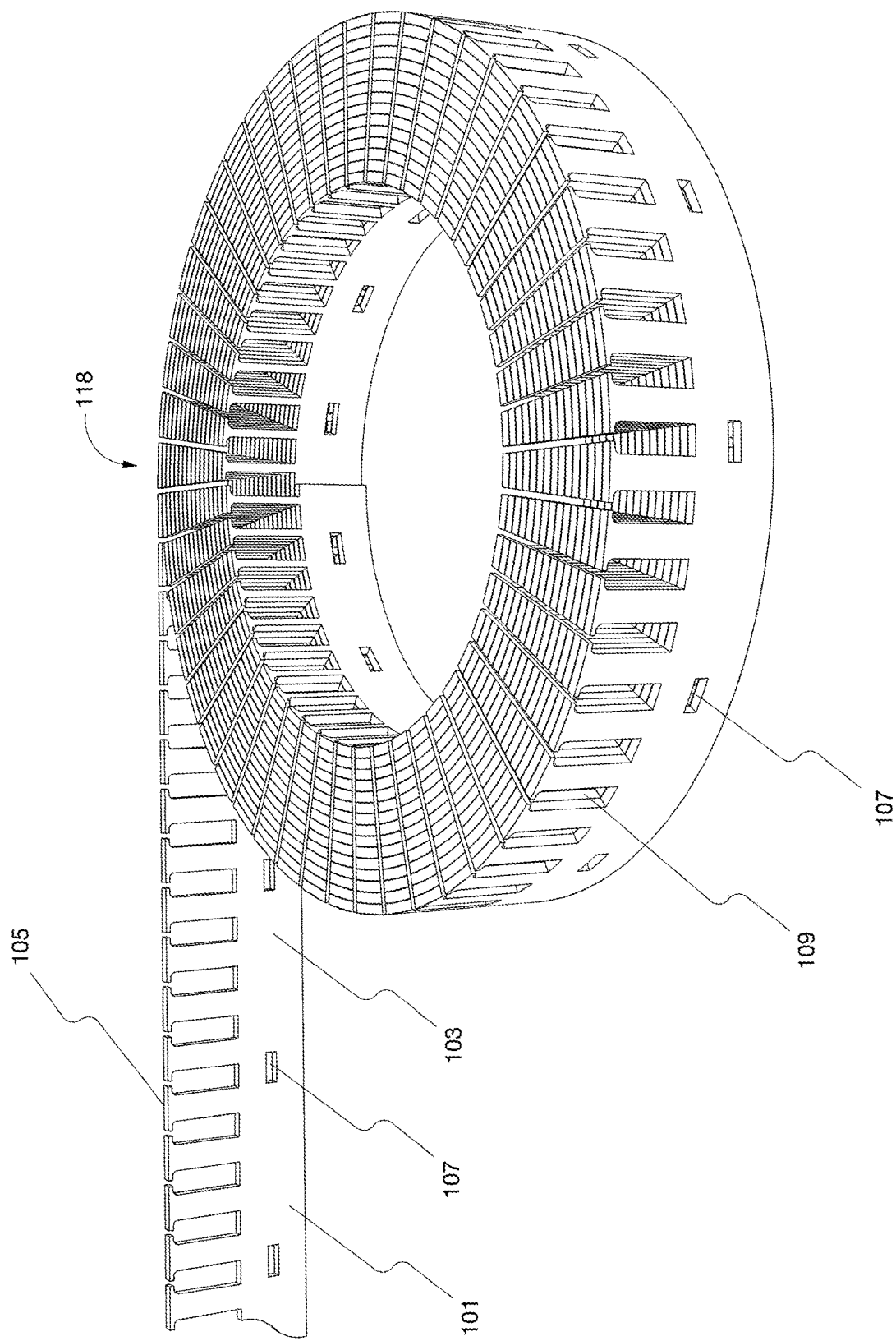
FIG. 11a is a perspective view of an axial-gap machine stator core which is formed by tape-winding a ferromagnetic strip, according to an embodiment of the present disclosure.
Figure 1L:
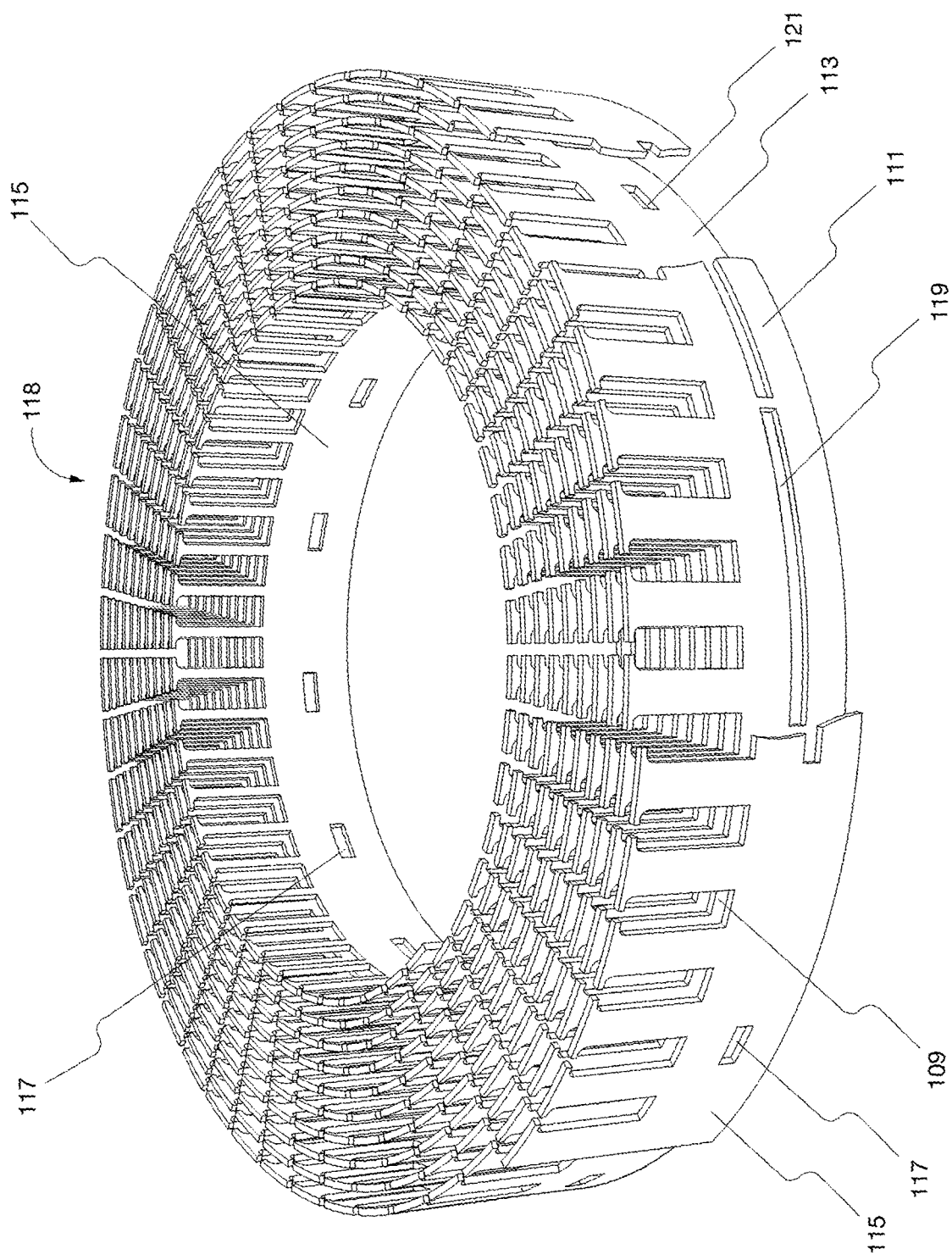

FIG. 11a shows axial-gap machine stator core 118 which is formed by tape-winding ferromagnetic strip 101. Strip 101 is notched such that when wound, conventional teeth 105, winding slots 109, and back-iron 103 portions are formed. As shown, tooth widths increase with the radius such that conductor slot widths are independent of the radius. Strip 101 also includes repeating apertures 107 which align or party align, such that cooling channels are formed when wound. Adjacent turns may be bonded together using a resin such as an epoxy. Other techniques such as tungsten inert gas (TIG) welding or clinches may be used to establish a rigid structure. Stator core 102 can be applied for either induction or permanent magnet machines. Both low and high pole count designs are easily achieved due to the relative ease of tape bending.

FIG. 11b is an expanded/cut-away view of the FIG. 11a axial-gap stator core 118 which shows details of the cooling apertures. As with the radial gap stator core of FIG. 1b, there are 2 m number of wide apertures 119 per turn within each even numbered turn; likewise, there are 2 m number of narrow apertures 121 per turn for each odd numbered turn, excluding the first and last turn, each of which has only m number of narrow flow director apertures 117.

One manifold located at the core O.D. (not shown) directs incoming coolant to flow director apertures 117, while a second manifold (not shown) receives coolant flow from the I.D. of the wound strip.

Figure 12:
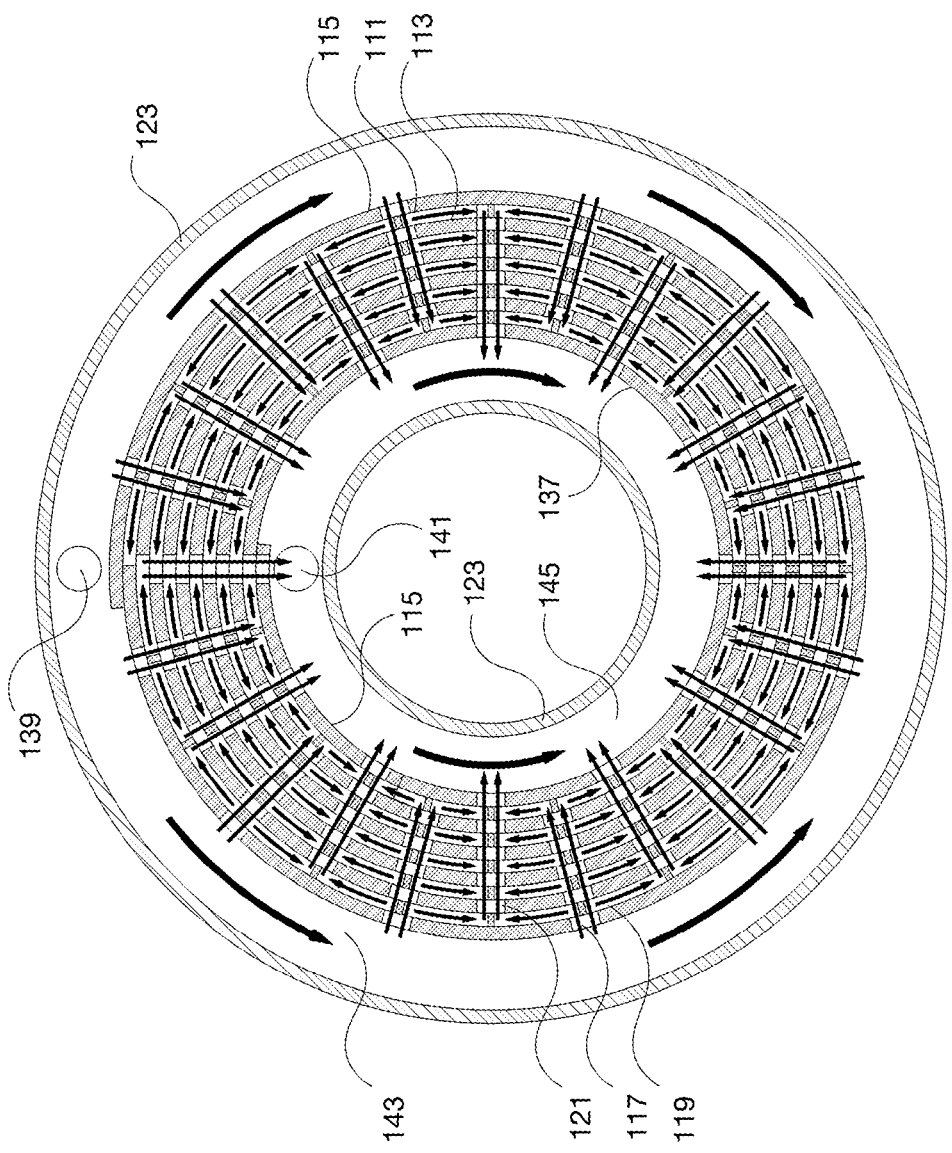
FIG. 12 is a flow diagram for axial-gap, wound-strip stator cores where coolant is introduced at the core O.D. core and retrieved at the core I.D., according to an embodiment of the present disclosure.

FIG. 12 is a flow diagram which applies to axial gap stator cores where coolant is introduced at the O.D. of the wound strip core and retrieved at the I.D. of the wound strip core. The stator core is represented by layers designated 111 (turn type 1), 113 (turn type 2), and 115 (turn type 3)—arranged in the order shown. A first manifold 123 (which may be around the outside of the face wound strip) forms an inlet cavity 143 which distributes coolant received from inlet 139 to a first set of flow director apertures 117 located on the stator core O.D. From there, fluid flows radially inward—such that the entire flow is forced to flow through thin azimuthal channels where most of the heat transfer takes place. Coolant exiting apertures 117 located within outlet flow director 137 at the I.D. is then distributed by outlet flow cavity 145 which is formed by a second manifold 123 (which may be inside the face wound strip). Coolant exits outlet 141.

Figure 13:
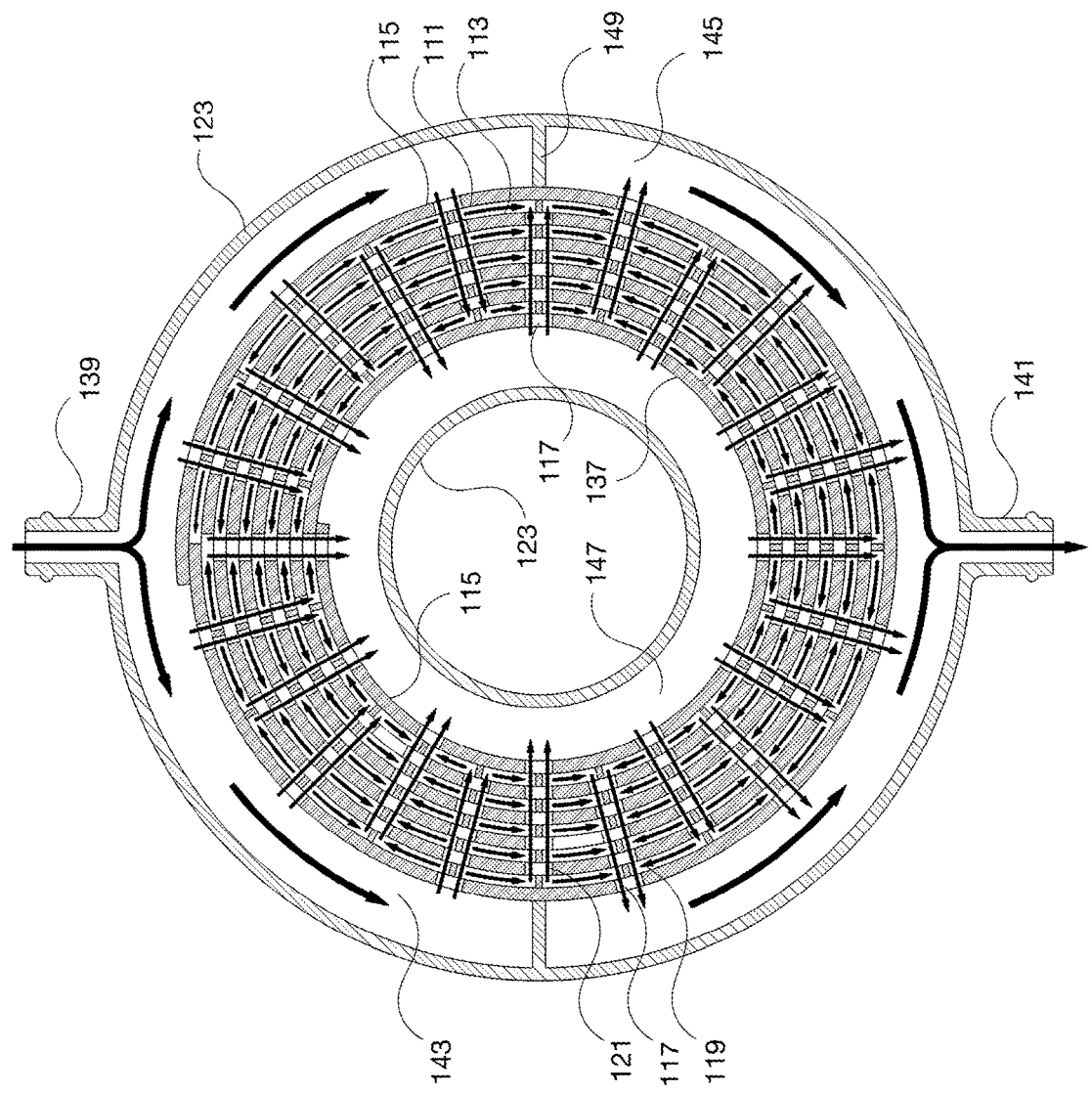
FIG. 13 is a flow diagram for axial-gap, wound-strip stator cores where coolant is both introduced and retrieved at the core O.D., according to an embodiment of the present disclosure.

FIG. 13 is a flow diagram which applies to axial gap stator cores where coolant is both introduced and retrieved at the O.D. of the wound strip core. The stator core is represented by layers designated 111 (turn type 1), 113 (turn type 2), and 115 (turn type 3)—arranged in the order shown. A first manifold 123 (which may be around a first portion of the outside of a face wound strip) forms an inlet cavity 143 which distributes coolant received from inlet 139 to a first set of flow director apertures 117 located on a 180 degree segment of the stator core O.D. From there, fluid flows radially inward—such that the entire flow is forced to flow through thin azimuthal channels where most of the heat transfer takes place. Coolant exiting apertures 117 located within a 180 degree segment of outlet flow director 137 at the I.D. is then distributed by interior flow cavity 147 and directed to reenter the lower half of flow director 137 and then flows radially outward and is collected by outlet flow cavity 145 (which is inside a second manifold, the second manifold being around a second portion of the outside of the face wound strip). Coolant exits outlet 141. Flow partitions 149 prevent flow in inlet cavity 143 from directly entering outlet cavity 145; all coolant flow is directed to flow through the strip. With this alternative design, both inlet and outlet flow are handled at the strip O.D. which may provide construction advantages compared with the FIG. 12 approach. The disadvantage is that head loss is roughly four times greater for the same total flow.

Figure 14:
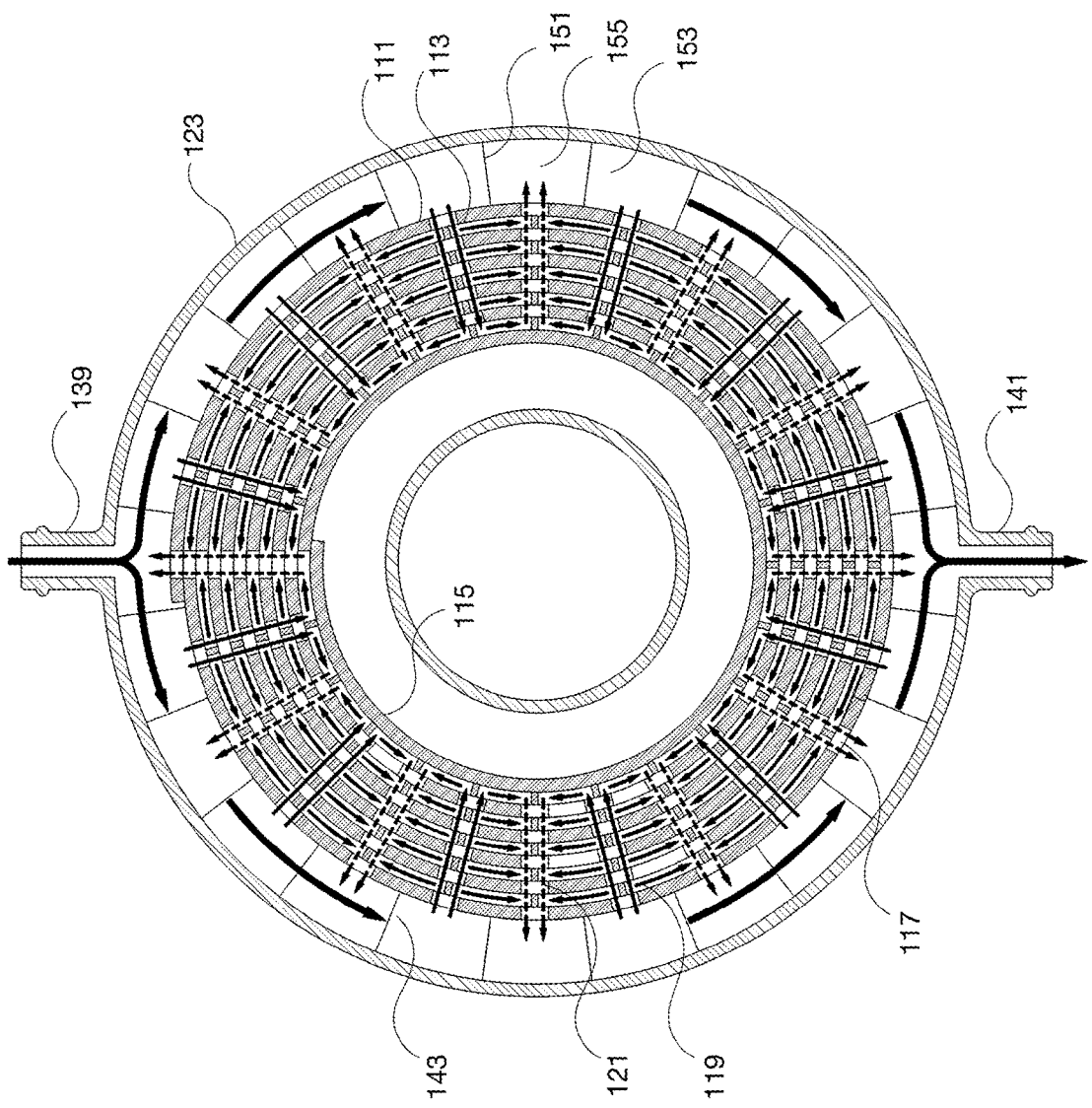
FIG. 14 is a flow diagram for axial-gap, wound-strip stator cores where coolant is both introduced and retrieved at the core O.D. and where head loss is the same as with the FIG. 12 arrangement, according to an embodiment of the present disclosure.

FIG. 14 is a flow diagram which applies to axial gap stator cores where coolant is both introduced and retrieved at the O.D. of the wound strip core and where head loss is the same as with the FIG. 12 arrangement. The stator core is represented by alternating layers designated 111 (turn type 1) and 113 (turn type 2). Flow cavities are formed by the combination of manifold 123 and inlet/outlet flow separator 151. This combination may be considered to form two manifolds, an inlet manifold and an outlet manifold (both being around the outside of the face wound strip). These two manifolds may be integrated, as shown in FIG. 14, or, in some embodiments, they may be separate elements. The inlet/outlet flow separator 151 serves to form contiguous flow paths between inlet coolant flow which occurs on upper regions 153 and odd numbered apertures, while also providing contiguous flow paths between outlet coolant flow which occurs on lower regions 155 and even numbered apertures. As such, all flow is forced to flow through the azimuthal paths as shown. Unlike the FIG. 13 scheme, azimuthal flow lengths are limited to a single path between adjacent radial pathways; no interior manifold or interior flow cavity is involved. As with both the FIGS. 12 and 13 schemes, coolant enters via inlet 139 and exits via outlet 141.

Figure 15A:
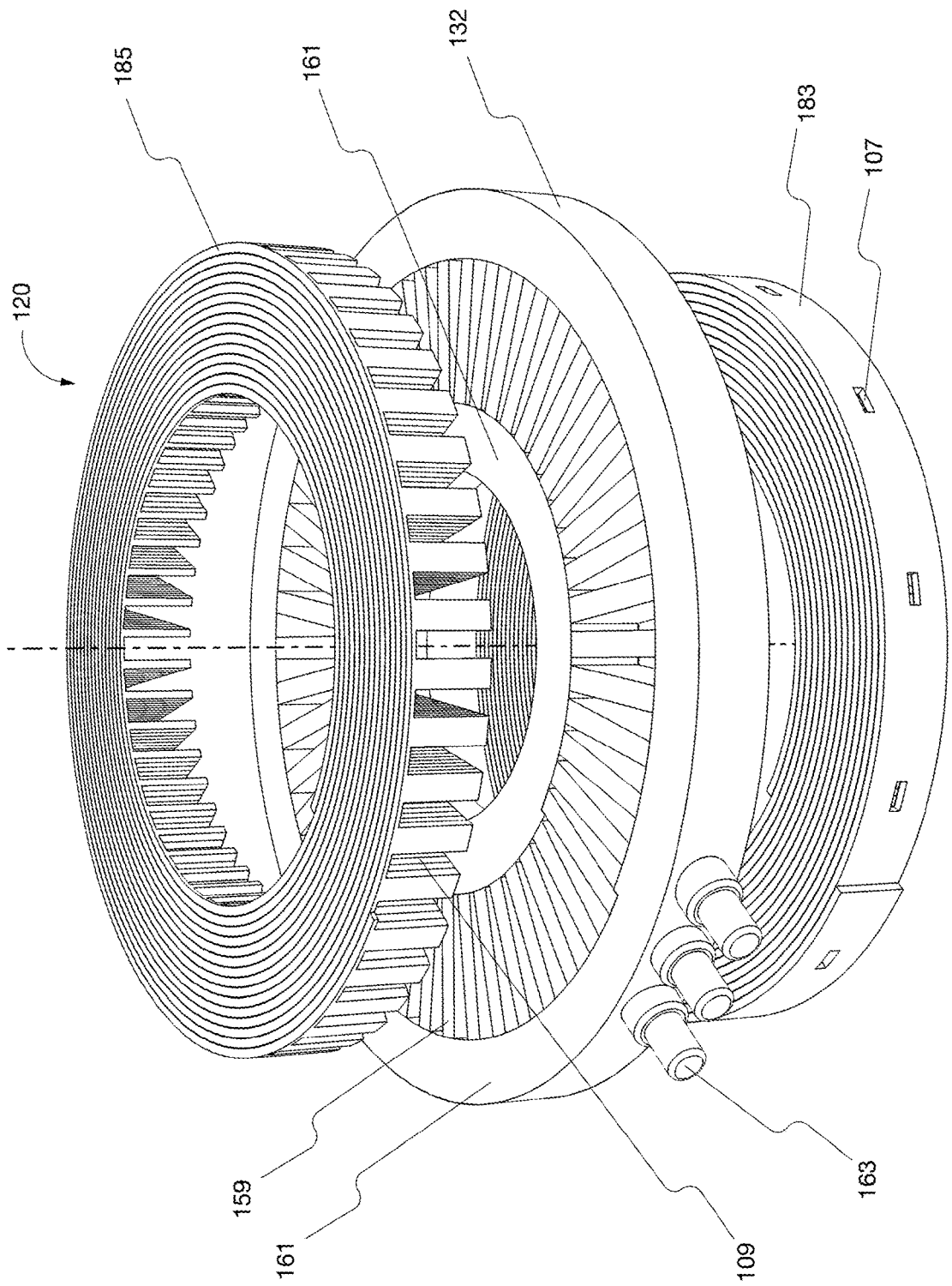
FIG. 15a is an exploded perspective view of an axial-gap, wound-strip stator, which includes a two-piece wound-strip core, according to an embodiment of the present disclosure.

FIG. 15a shows two-piece wound-strip, axial-gap stator 120, which is in turn composed of winding 132, wound-strip tooth iron element 185, and a wound-strip back-iron element 183. In turn, wound-strip tooth iron element 185 includes slots 109 which align to form slot channels with receive active winding elements 159. Inner and outer end turns 161 and winding terminals 163 each project radially as shown in FIG. 15a. Back iron element 183 is also formed as a tape-wound strip. Included within the strip are repeating apertures 107 which align or partly align such that coolant flow paths are established. The tooth and back-iron strips may be bonded together to form a rigid element by use of a bonding agent such as an epoxy resin. In some embodiments, coolant is applied at the strip O.D. via a first manifold system and recovered at the I.D. by a second manifold system.

Figure 15B:
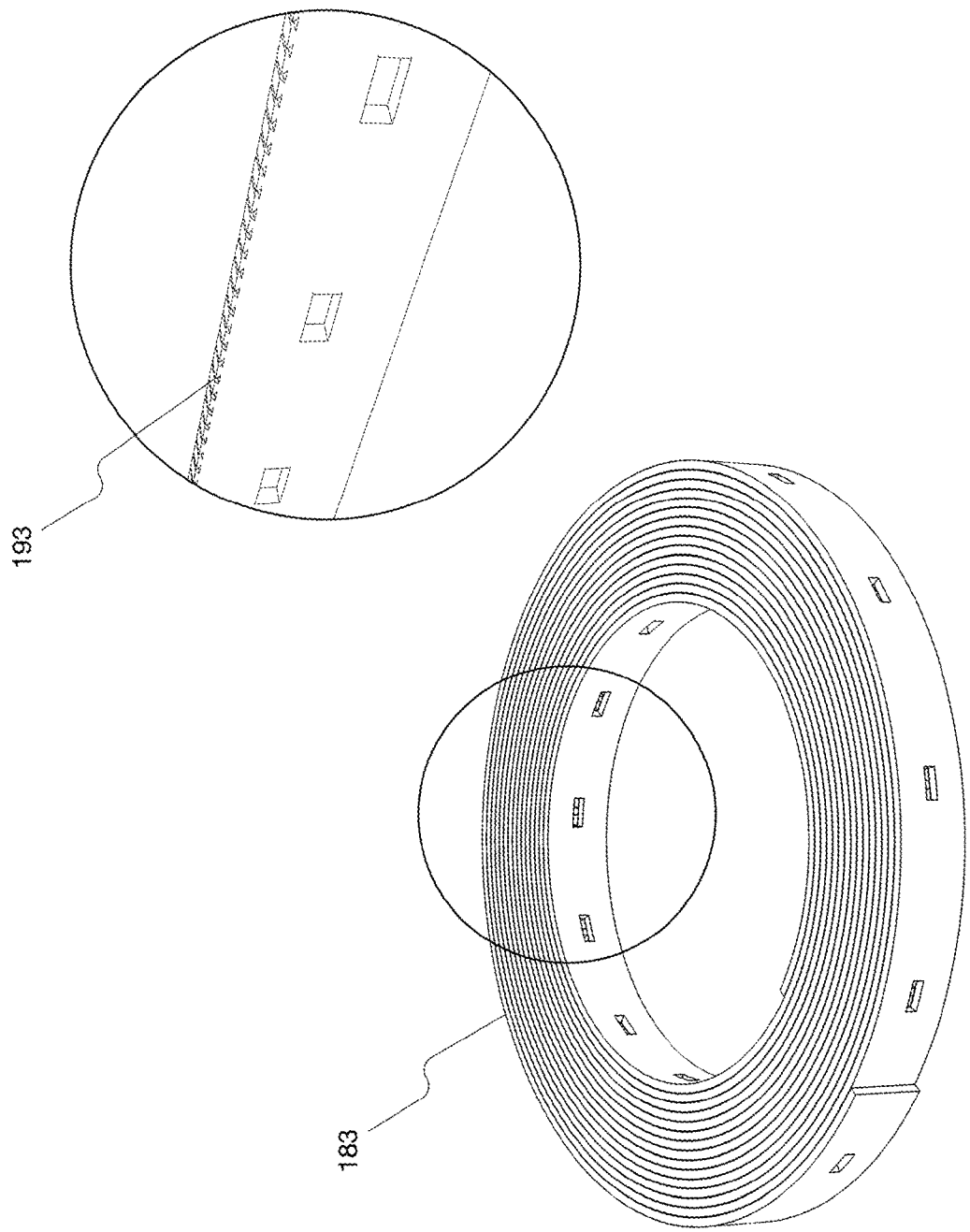
FIG. 15b is a perspective view which provides detail for wound-strip back-iron element of FIG. 15a, according to an embodiment of the present disclosure.

FIG. 15b provides detail for wound-strip back-iron element 183. As shown in the detail view, strip edges may contain dovetail bonding grooves 193 which aid in the bonding and mechanical reinforcement of the tooth strip. Similar grooves may be applied to the tooth strip material.

FIG. 16a illustrates an alternative two-piece wound-strip stator 122 composed of wound-strip tooth element 185 and wound-strip back-iron element 183. With this design, winding tooth and slot features are included in both strip elements. The back-iron element includes apertures which align or partly align such that coolant flow apertures are formed. Flow paths conform to that shown in FIG. 14, where flow both enters and exits back-iron element 183 from the O.D. As described in the FIG. 14 diagram, inlet and outlet flow is separated by inlet/outlet flow separator 189. The combination of manifold 123 and inlet/outlet flow separator 189 form an inlet cavity which is contiguous with odd numbered apertures 107a and inlet 139. Likewise, manifold 123 and flow separator 189 form a second flow cavity which is contiguous with even numbered apertures 107b and outlet 141. The embodiment of FIG. 16a may lack the deep winding slots and narrow tooth gaps that may be an impediment (due to shadowing) to powder coating of the winding slots; in some embodiments according to FIG. 16a, the winding slots are powder coated and slot liners are not used.

The winding may be pre-formed and applied to either wound strip tooth element 185 or wound strip back-iron element 183. In turn, the winding consists of active radial elements 159 and end turn elements 161. After the winding is secured in one of the two halves, the two strip elements can then be bonded together to form a rigid structure.

FIG. 16b is a detail of the active winding section which illustrates wire strand deformation as a result of compacting. The winding of FIG. 16b may be fabricated by first winding a suitable number of turns of conventional round magnet wire (i.e., magnet wire having a conductor with a circular cross section, coated with an insulating layer) on a suitable jig and then applying sufficient pressure to cause the wire to deform and largely fill the inter-winding gaps that are otherwise present in windings formed of round wire. In some embodiments the void fraction may be reduced (e.g., from 9.31%, the void fraction of closely packed circular cylinders) to 1% or less when the cylinders are deformed to become closely packed hexagons. Other windings (e.g., the winding of FIG. 4) may be formed in an analogous manner.

Figure 17:
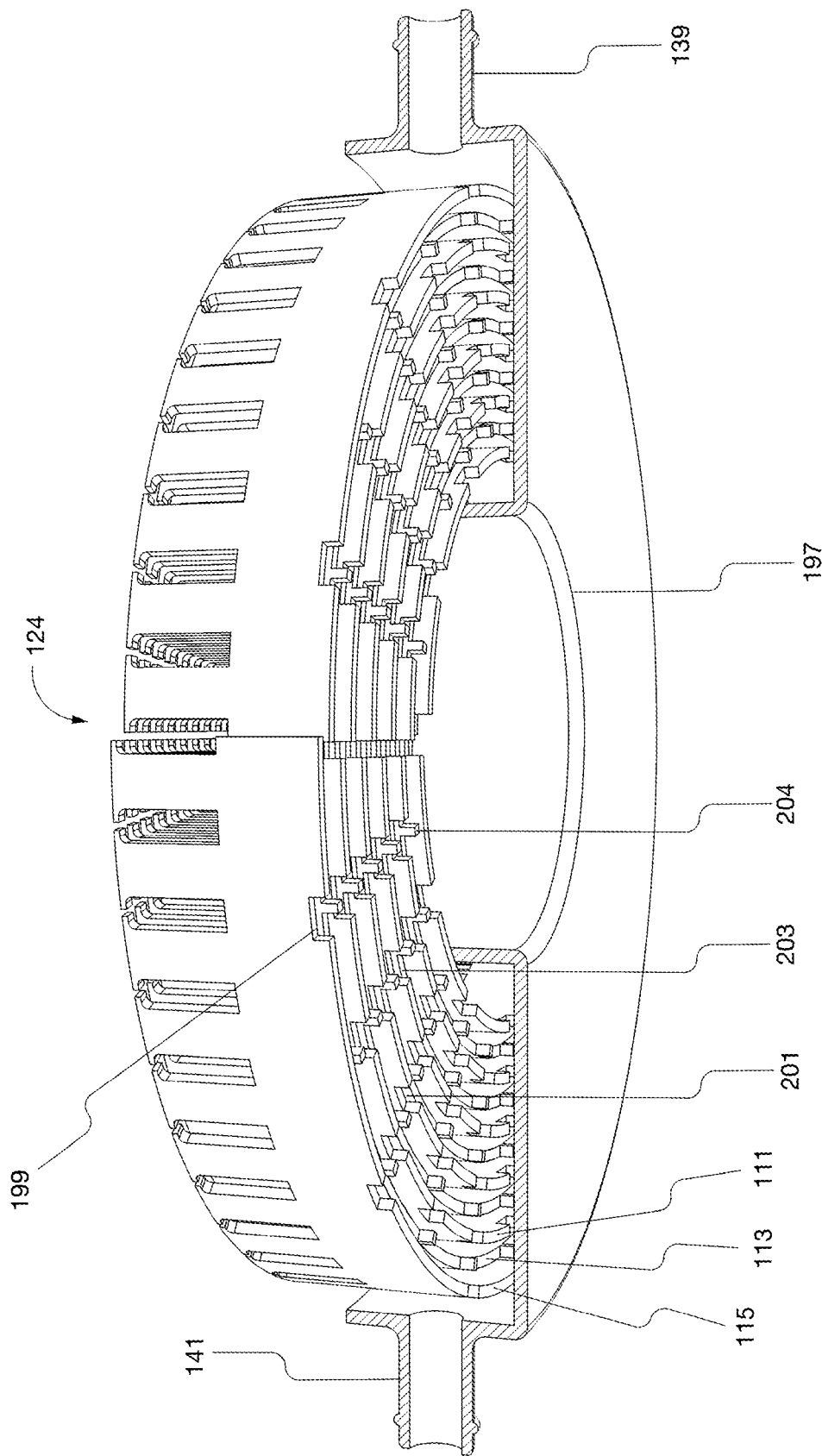
FIG. 17 is an expanded perspective view of an axial-gap, wound-strip stator core, which uses notches, rather than apertures, to provide cooling channels.

FIG. 17 illustrates a wound strip axial-gap stator core 124 (expanded view) which includes notches, as opposed to apertures, to provide cooling channels. Flow channels are completed when the wound strip is mated with an enclosure member (not shown). This approach may be extended to corresponding two-piece stator core designs. As with previous figures, the wound strip includes three types of turns, which are combined such that cooling paths are established which conform to the flow diagram of FIG. 13. Specifically, wide notches 203 are applied to turn types 1 (111), narrow notches 201 are applied to turn types 2 (113), and flow director notches 199 are applied to turn types 3 (115). Note that either single piece or two piece stator cores may be used in connection with the notch construction. It has a slight disadvantage in that the heat flow path length within the back iron is lengthened. The tabs or "webs" 204 shown, in FIG. 17, on the lower edge of each type 1 turn separating the wide notches may be absent. In such an embodiment each type 1 turn may simply have a reduced width, instead of having a plurality of wide notches separated by webs. As shown in FIG. 17, the enclosure 197 forms an inlet manifold, an outlet manifold, and an interior flow cavity.

Any of the wound strip structures described herein may include a sealant (e.g., a resin sealant) between adjacent turns of the wound strip to prevent or reduce leakage out of the fluid channels through small gaps between adjacent turns, which may not abut perfectly over opposing surfaces. Similarly a compound (e.g., an adhesive, compliant, and/or thermally conductive resin (or "thermal interface agent"), e.g. a resin having a thermal conductivity of at least 0.5 W/K/m) may be used between elements of a wound strip machine (e.g., between concentric wound strip elements such as those of FIGS. 4 and 5) to secure the elements together, to provide a seal, or to improve cooling.

It will be understood that in some embodiments stacks of laminations may be substituted for wound strips, in any of the embodiments disclosed herein, in which one or more wound strips are employed. Although several embodiments are illustrated with regular sets of openings (i.e., apertures or notches) (e.g., regularly spaced apertures, all having the same size and shape, or alternating between two different shapes) forming fluid channels, the invention is not limited to such embodiments, and in some embodiments the sizes, shapes, and locations of the openings may vary so that they are not regular, while nonetheless forming, e.g., feed channels that are largely axial and cooling passages that are largely azimuthal (in an edge-wound structure) or (in a face-wound structure) feed passages that are largely radial and cooling passages that are largely azimuthal, or while providing, feed passages that are instead curved or serpentine or angled, or cooling passages that are angled or curved or serpentine. In some embodiments the openings are all the same size, instead of alternating, on alternating turns, between wide and narrow openings.

The cooling passages may have a dimension, which may be referred to as a "characteristic heat flow length within the coolant", which is defined herein to be the smallest transverse dimension of the cooling channel along any line passing through the centroid of the cooling passage. For example, for a cooling passage with a rectangular cross section, the characteristic heat flow length within the coolant is the smaller of the two dimensions (i.e., of the two edge lengths) of the rectangle. The smaller this dimension is, the better the heat transfer may be. In some embodiments, a specific heat transfer of in the range of 0.02 W/cm³/C to 1 W/cm³/C may be achieved. As used herein, "specific heat transfer" means a rate of heat energy removal by cooling fluid, per unit volume of the wound strip structure, per degree C. of temperature increase of the cooling fluid.

In some embodiments, the characteristic distance (L) between cooling surfaces may be calculated as follows, assuming a desired power dissipation per unit volume per degree C. rise; the desired power dissipation per unit volume per degree C. rise may be referred to as H. If K is the average thermal conductivity of material involved, the characteristic distance (L) between cooling surfaces is approximately $L=(K/H)^{0.5}$.

As an example, the wound strip structure may be composed of silicon steel, which has a thermal conductivity of about 30 W/m/C. If H=0.1 W/cm^3/C, it may be converted to standard units as follows: H=0.1 W/cm^3/C×(1,000,000 cm^3/m^3)=100,000 W/m^3/C. Hence, $L=(30/100,000)^{0.5}=0.017$ m=1.7 cm=17 mm. (This is the distance between cooling surfaces.) Similarly, in the case where H=0.02 W/cm^3/C, L=3.9 cm; and in the case where H=1 W/cm^3/C, L=0.55 cm.

In the case where channel thickness is equal to one lamination thickness (or to the thickness of the strip), the characteristic heat flow length within the coolant may be equal to one fourth the lamination thickness (or to one fourth the thickness of the strip). Thus, in the case of 10 mil laminations (or a strip with a thickness of 10 mils), the characteristic heat flow length may be 2.5 mils or about 0.06 mm. In some embodiments the characteristic heat flow length within the coolant is less than 12 mils, or in a range of 1.0 mils to 20.0 mils.

With some applications, functional elements of an electric machine may be part of an associated element and vice versa. For example, in the case where the electric machine drives a gear box, the gear pinion may be an integral part of the motor shaft, while the corresponding bearing is part of the gear box. In a like manner, the machine may include one or two rotary fluid couplings for supplying coolant to the rotor; one or both of the fluid couplings or one or both stator manifolds may be parts of external elements, such as gear boxes, inverters, or tandem machines. Moreover, although in some examples herein an electric machine has been described as an induction motor, it may be, or be a part of, another machine, such as a DC brushless machine, a linear machine, or a machine including a gearbox. In one embodiment the electric machine is a permanent magnet machine with a permanent magnet rotor, and the stator includes some or all of the features described herein. In one embodiment a gearbox that is part of or coupled to the electric machine includes, or supports, a stator manifold, an end bell, a bearing, and/or a fluid coupling. Fluid openings within any one turn or lamination (e.g., of a magnetic core, such as a rotor core or a stator core) may be identical or different in shape and/or size, and a fluid aperture in one turn or lamination may be identical to a fluid aperture in another turn or lamination, or different, in shape and/or size, from a fluid aperture in another turn or lamination.

Although in some examples described herein a wound strip stator core is described, the invention is not limited to such structures and, for example, in some embodiments a rotor core includes one or more wound strips, arranged, for example, in a manner analogous to that of wound strip stator cores described herein. In one embodiment only the stator or only the rotor of the electric machine is cooled.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a wound strip machine have been specifically described and illustrated herein, many modifications and variations will be apparent to those skilled in the art. Accordingly, it is to be understood that a wound strip machine constructed according to principles of this disclosure may be embodied other than as specifically described herein. The invention is also defined in the following claims, and equivalents thereof.

What is claimed is:

1. An electric machine comprising one or more face wound strips including a first strip, the one or more strips having a plurality of openings, the first strip having a plurality of turns, an opening of a turn of the first strip overlapping an opening of an adjacent turn, to form a portion of a fluid channel of a plurality of fluid channels, the turn and the adjacent turn abutting against each other at the overlapping openings.

2. The electric machine of claim 1, wherein the electric machine is an axial gap electric machine.

3. The electric machine of claim 1, wherein a subset of the openings are narrow and a subset of the openings are wide.

4. The electric machine of claim 1, comprising:
a stator having a stator core comprising the one or more face wound strips, and
a rotor,
the rotor having a fluid passage.

5. The electric machine of claim 1, further comprising a manifold having a manifold channel in fluid communication with the fluid channel.

6. The electric machine of claim 1, further comprising a flow director.

7. The electric machine of claim 1, comprising the first strip and a second strip co-wound with the first strip.

8. The electric machine of claim 1, wherein:
the one or more face wound strips further include a second strip,
the first strip has a plurality of substantially identical openings,
the second strip has a plurality of substantially identical openings, and
an opening of the first strip differs in shape and/or size from an opening of the second strip.

9. The electric machine of claim 1, further comprising a sealant between the turn and the adjacent turn, and/or within a fluid channel of the plurality of fluid channels.

10. The electric machine of claim 1, wherein:
the one or more face wound strips further include a second strip concentric with the first strip, wherein:
the first strip is configured as a back-iron portion of a stator core of the electric machine; and
the second strip has a plurality of teeth, and is configured as a tooth portion of the stator core.

11. The electric machine of claim 10, further comprising bonding agent and/or thermal interface agent, between the first strip and the second strip.

12. The electric machine of claim 1, further comprising an enclosure, wherein a portion of an interior surface of the enclosure forms a portion of wall of a fluid channel of the plurality of fluid channels.

13. The electric machine of claim 1, further comprising a winding, wherein a portion of the winding comprises insulated conductors packed with a void fraction of less than 12%.

14. The electric machine of claim 1, comprising a stator core comprising the one or more face wound strips, the electric machine further comprising a winding, and a potting compound, filling a void between the stator core and the winding, the potting compound having a thermal conductivity of at least 0.5 W/K/m.

15. The electric machine of claim 1, wherein the first strip is composed of a non-isotropic magnetic material, and
the first strip includes a tooth portion of a stator of the electric machine, and a magnetic permeability tensor of the first strip has, within a tooth of the stator, a substantially radial eigenvector, the substantially radial eigenvector corresponding to a greatest eigenvalue of the magnetic permeability tensor of the first strip; or
the first strip includes a back-iron portion of a stator of the electric machine, and a magnetic permeability tensor of the first strip has, within the back-iron portion of the stator, a substantially azimuthal eigenvector, the substantially azimuthal eigenvector corresponding to a greatest eigenvalue of the magnetic permeability tensor of the first strip.

16. The electric machine of claim 1, wherein the plurality of fluid channels includes:
a first fluid channel,
a second fluid channel, and
a third fluid channel,
the first fluid channel and the second fluid channel both being:
substantially axial, or
substantially radial,
the third fluid channel connecting the first fluid channel and the second fluid channel, the third fluid channel being not parallel to the first fluid channel and the third fluid channel being not parallel to the second fluid channel.

17. The electric machine of claim 1, wherein:
the first strip includes a back-iron portion of a stator of the electric machine, and a magnetic permeability tensor of the first strip has, within the back-iron portion of the stator, a substantially azimuthal eigenvector, the substantially azimuthal eigenvector corresponding to a greatest eigenvalue of the magnetic permeability tensor of the first strip; and
the stator includes a tiled or multi-piece tooth portion, wherein a magnetic permeability tensor of the tooth portion has a substantially radial eigenvector, the substantially radial eigenvector corresponding to a greatest eigenvalue of the magnetic permeability tensor of the tooth.

18. The electric machine of claim 1, further comprising:
a first manifold around the outside of a first face wound strip of the one or more face wound strips, and
a second manifold inside the first face wound strip,
the second manifold being in fluid communication with the first manifold.

19. The electric machine of claim 1, further comprising:
a first manifold around a first portion of the outside of a first face wound strip of the one or more face wound strips,
a second manifold around a second portion of the outside of the first face wound strip, and
an interior flow cavity inside the first face wound strip,
wherein the electric machine is configured to cause fluid flowing into an inlet port of the first manifold to flow:
through the first face wound strip into the interior flow cavity, and
from the interior flow cavity through the first face wound strip into the second manifold.

20. The electric machine of claim 1, comprising a magnetic core comprising:
a first core portion comprising the one or more face wound strips; and
a second core portion, coaxial with and abutting against the first core portion.

21. The electric machine of claim 1, wherein the one or more face wound strips are configured to provide a specific heat transfer of between 0.02 W/cm$^3$/C and 1 W/cm$^3$/C.

22. The electric machine of claim 1, further comprising:
a first manifold extending around the outside of a first face wound strip of the one or more face wound strips,
a second manifold extending around the outside of the first face wound strip, and
wherein:
- the openings form a plurality of feed passages and a plurality of cooling passages,
- the first manifold and the second manifold are configured to cause fluid flowing into an inlet port of the first manifold to flow:
  - inward through a first subset of the feed passages,
  - through the cooling passages to a second subset of the feed passages, and
  - from the second subset of the feed passages to an outlet of the second manifold.

23. An electric machine fluid cooling jacket comprising:
one or more face wound strips,
a plurality of fluid channels, and
a manifold;
the one or more face wound strips including a first strip, the one or more face wound strips having a plurality of openings, the first strip having a plurality of turns, an opening of a turn of the first strip overlapping an opening of an adjacent turn, to form a portion of a fluid channel of the plurality of fluid channels, the turn and the adjacent turn abutting against each other at the overlapping openings, and the manifold having a manifold channel in fluid communication with the plurality of fluid channels.

\* \* \* \* \*